United States Patent
Ioannou et al.

(10) Patent No.: US 10,235,396 B2
(45) Date of Patent: Mar. 19, 2019

(54) WORKLOAD OPTIMIZED DATA DEDUPLICATION USING GHOST FINGERPRINTS

(71) Applicant: INTERNATIONAL BUSINESS MACHINES CORPORATION, Armonk, NY (US)

(72) Inventors: Nikolas Ioannou, Zürich (CH); Roman A. Pletka, Zürich (CH); Cheng-Chung Song, Tucson, AZ (US); Radu Stoica, Adliswil (CH); Sasa Tomic, Kilchberg (CH); Andrew D. Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 15/250,276

(22) Filed: Aug. 29, 2016

(65) Prior Publication Data

US 2018/0060367 A1 Mar. 1, 2018

(51) Int. Cl.
*G06F 17/00* (2006.01)
*G06F 17/30* (2006.01)

(52) U.S. Cl.
CPC .. *G06F 17/30303* (2013.01); *G06F 17/30336* (2013.01)

(58) Field of Classification Search
CPC .... G06F 17/30; G06F 17/00; G06F 17/30303; G06F 17/30336

(Continued)

(56) References Cited

U.S. PATENT DOCUMENTS 8,392,384 B1 3/2013 Wu et al.
8,412,682 B2 4/2013 Zheng et al.
(Continued)

FOREIGN PATENT DOCUMENTS

CN 104813310 7/2015

OTHER PUBLICATIONS

International Business Machines Corporation, International application No. PCT/IB2017/054421, International filing late Jul. 21, 2017. International Search Report and Written Opinion dated Sep. 27, 2017.

(Continued)

*Primary Examiner* — Isaac M Woo
(74) *Attorney, Agent, or Firm* — Brian F. Russell; Robert Sullivan

(57) ABSTRACT

A controller of a data storage system generates fingerprints of data blocks written to the data storage system. The controller maintains, in a data structure, respective state information for each of a plurality of data blocks. The state information for each data block can be independently set to indicate any of a plurality of states, including at least one deduplication state and at least one non-deduplication state. At allocation of a data block, the controller initializes the state information for the data block to a non-deduplication state and, thereafter, in response to detection of a write of duplicate of the data block to the data storage system, transitions the state information for the data block to a deduplication state. The controller selectively performs data deduplication for data blocks written to the data storage system based on the state information in the data structure and by reference to the fingerprints.

25 Claims, 11 Drawing Sheets

(58) Field of Classification Search
USPC .................................................. 707/600–899
See application file for complete search history.

(56) References Cited

U.S. PATENT DOCUMENTS

| | | |
|---|---|---|
| 9,058,298 B2 | 6/2015 | Anglin et al. |
| 9,069,786 B2 | 6/2015 | Colgrove et al. |
| 9,251,160 B1 | 2/2016 | Wartnick |
| 9,367,575 B1 | 6/2016 | Bromley et al. |
| 2010/0042790 A1* | 2/2010 | Mondal ................. G06F 3/0608 711/161 |
| 2015/0154411 A1 | 6/2015 | Fiske et al. |
| 2016/0224595 A1 | 8/2016 | Bandic et al. |

OTHER PUBLICATIONS

Wildani, "HANDS: A Heuristically Arranged Non-Backup In-line Deduplication System", IEEE pp. 446-457, ICDE Conference 2013.

Miller, "The What, Why and How of the Pure Storage Enterprise Flash Array", Pure Storage, Inc. 2013.

Harnik, "Estimation of Deduplication Ratios in Large Data Sets", IEEE pp. 1-11, 2013.

Salada, J., & Barreto, J. (2013). TurboSockets: democratizing distributed deduplication. Trust, Security and Privacy in Computing and Communications (TrustCom), 1291-1298.

Mudrankit, A. (2012). A context aware block layer: the case for block layer deduplication (Doctoral dissertation, Stony Brook University).

Zhang, L.H. (2013). Reroute with clone in a multi-node deduplication system. IPCOM000227385D, 1-4.

\* cited by examiner

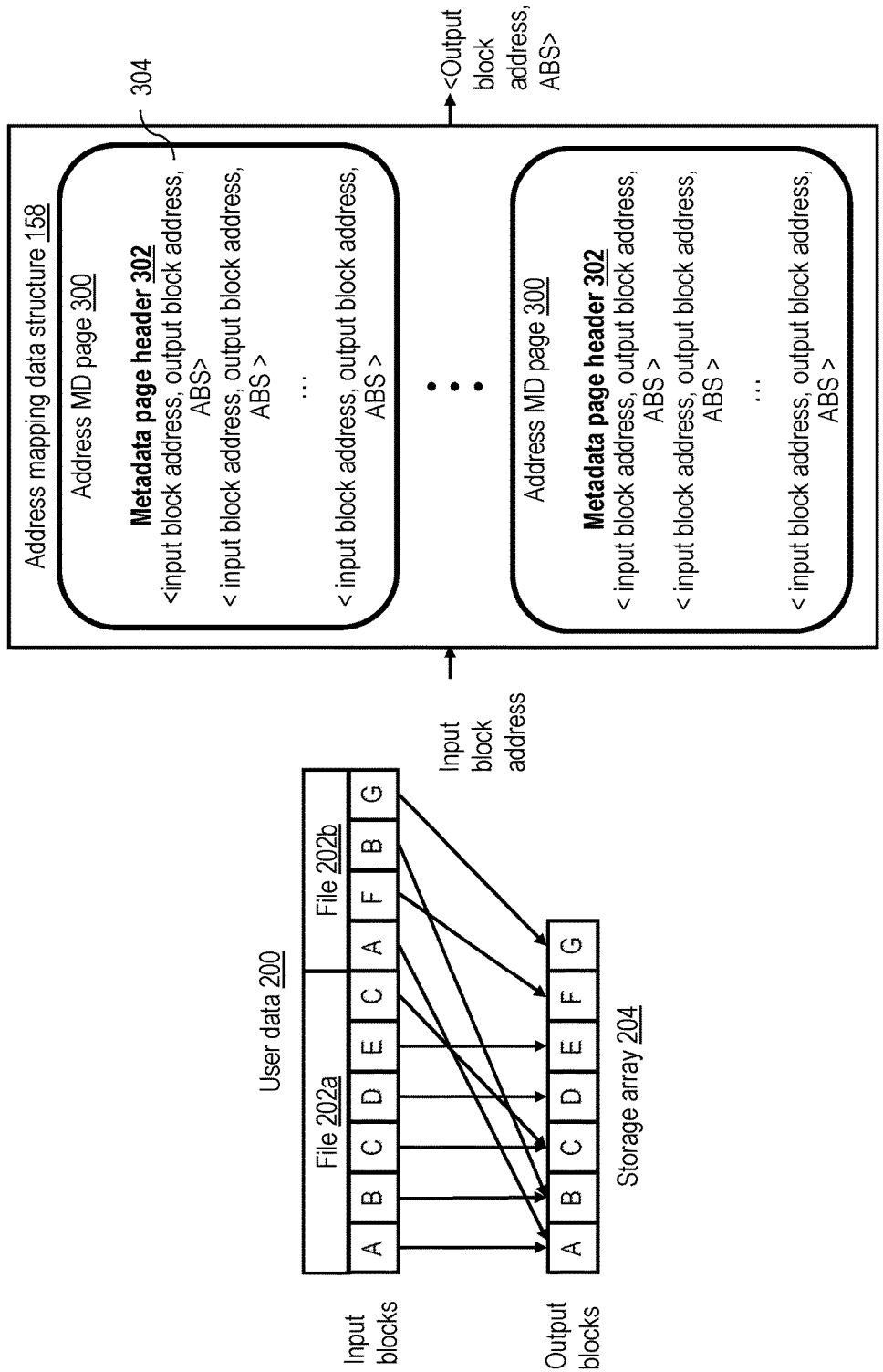

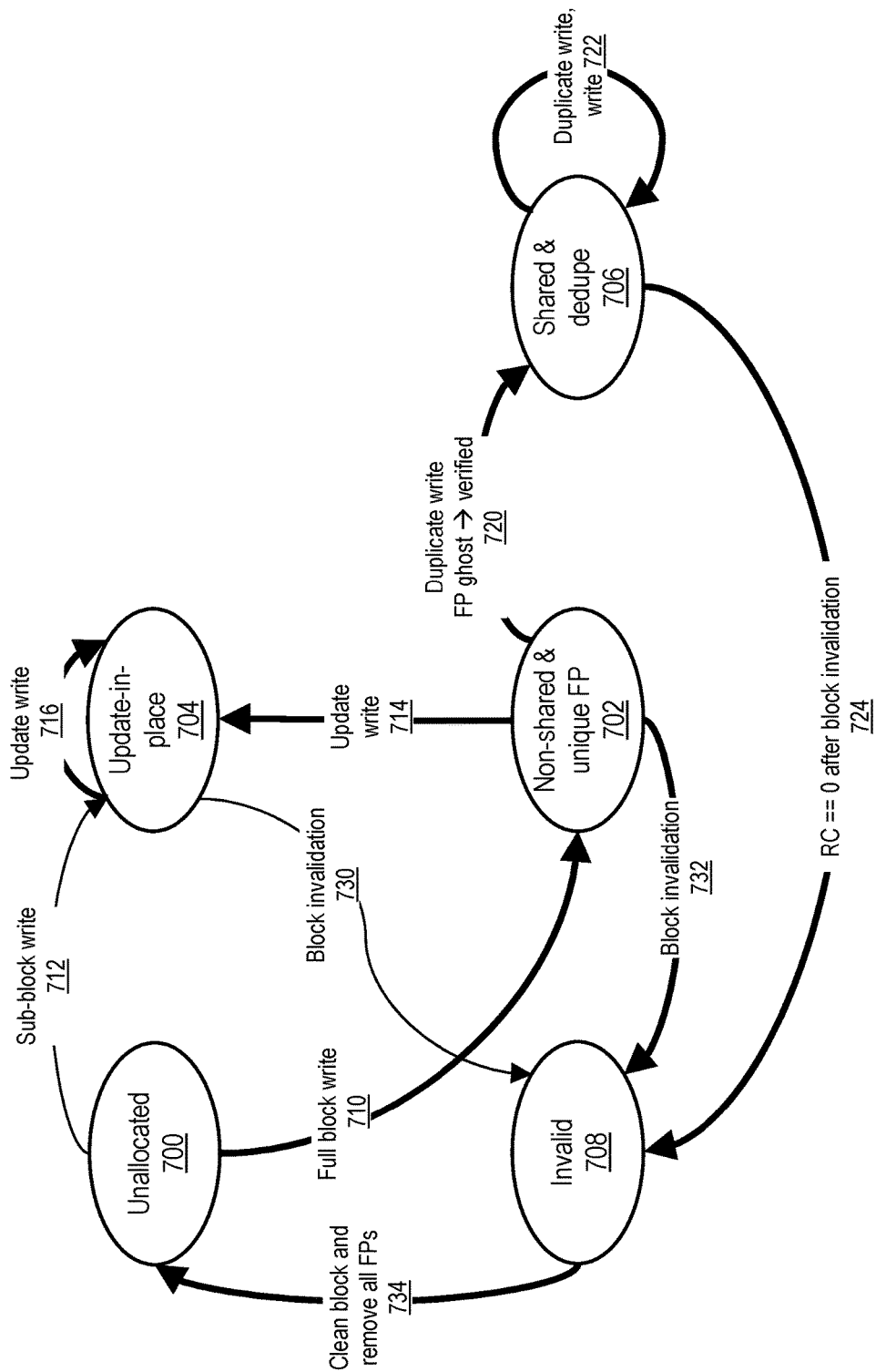

WORKLOAD OPTIMIZED DATA DEDUPLICATION USING GHOST FINGERPRINTS

BACKGROUND OF THE INVENTION

This disclosure relates to data processing and storage, and more specifically, to management of a data storage system, such as a flash-based data storage system, to optimize data deduplication.

NAND flash memory is an electrically programmable and erasable non-volatile memory technology that stores one or more bits of data per memory cell as a charge on the floating gate of a transistor or a similar charge trap structure. In a typical implementation, a NAND flash memory array is organized in blocks (also referred to as "erase blocks") of physical memory, each of which includes multiple physical pages each in turn containing a multiplicity of memory cells. By virtue of the arrangement of the word and bit lines utilized to access memory cells, flash memory arrays can generally be programmed on a page basis, but are erased on a block basis.

As is known in the art, blocks of NAND flash memory must be erased prior to being programmed with new data. A block of NAND flash memory cells is erased by applying a high positive erase voltage pulse to the p-well bulk area of the selected block and by biasing to ground all of the word lines of the memory cells to be erased. Application of the erase pulse promotes tunneling of electrons off of the floating gates of the memory cells biased to ground to give them a net positive charge and thus transition the voltage thresholds of the memory cells toward the erased state.

Over thousands of program/erase cycles, the voltage-induced stress on the NAND flash memory cells imparted by the program-erase process causes bit error rates for the data programmed into the NAND flash memory cells to increase over time and thus limits the useful life of NAND flash memory. Consequently, it is desirable to reduce the number of program/erase cycles for NAND flash memory by decreasing the volume of data written into the NAND flash memory through data deduplication (i.e., eliminating storage of duplicate copies of data). In addition, deduplication reduces the cost per effective capacity of flash-based storage systems and can lower the space utilization of a flash-based storage system which in turn reduces the internal data storage overhead such as write amplification.

In general, during the data deduplication process, unique chunks of data (e.g., data blocks or pages) are identified and stored within the NAND flash memory. Other chunks of data to be stored within the NAND flash memory are compared to stored chunks of data, and when a match occurs, a reference that points to the stored chunk of data is stored in the NAND flash memory in place of the redundant chunk of data. Given that a same data pattern may occur dozens, hundreds, or even more than thousands of times (the match frequency may be dependent on a chunk size), the amount of data that must be stored can be greatly reduced by data deduplication.

A data storage system can perform deduplication using either or both of an in-line deduplication process and a background deduplication process. With in-line data deduplication, the data storage system determines if incoming data to be stored duplicates existing data already stored on the storage media of the data storage system by computing a hash (also referred to in the art as a "fingerprint") of the incoming data and performing a lookup of the hash in a metadata data structure. If a match is found in the metadata data structure, the data storage system stores a reference to the existing data instead of the incoming data. Some deduplication methods may additionally perform a one-to-one comparison of the old and new data. With background deduplication, the data storage system stores all incoming write data to the storage media, and a background process subsequently searches for and replaces duplicate data with a reference to another copy of the data. Background data deduplication can decrease store latency compared to in-line deduplication because a hash computation and lookup to determine duplication of data (and optionally a one-to-one data comparison) do not need to be performed before storing incoming write data. However, implementing background data deduplication typically employs resource-intensive background scanning, and in case the deduplication ratio of the data is greater than one requires a greater storage capacity and causes increased wear on the storage media as compared to data storage systems utilizing in-line deduplication. Conversely, in-line data deduplication requires less data storage capacity and may reduce wear of the storage media, but, if not properly managed, can result in an appreciably higher store latency and in a decreased write bandwidth.

Regardless of whether in-line or background deduplication is employed, the data storage system is required to persistently store (e.g., in NAND flash memory) a large volume of hashes ("fingerprints") in the metadata data structure(s). In addition, in order to achieve reasonably good performance, data storage systems typically utilize a large amount of dynamic memory (e.g., dynamic random access memory (DRAM)) to enable quick access to the metadata data structures. However, because in real world systems the size of the dynamic memory is necessarily limited, it is typical that portions of the metadata data structures have to be paged in and out from non-volatile storage, reduced in size, or completely dropped, which ultimately negatively impacts overall I/O performance and/or deduplication ratio. Consequently, the appropriate management of fingerprints presents an issue that impacts deduplication performance and thus overall I/O performance.

U.S. Pat. No. 8,392,384B1 discloses one technique for managing fingerprints in which the overall storage volume of fingerprints is managed to fit those fingerprints likely to be accessed into a dynamic memory (i.e., cache). In this approach, fingerprints are classified, via binary sampling, into sampled and non-sampled types only when the cache becomes full, and only non-sampled fingerprints are allowed to be replaced in the cache. In particular, one or more bits of a fingerprint can be used to decide to which type the fingerprint belongs, thereby reclassifying sampled entries into non-sampled ones. In this approach, all fingerprints in the fingerprint index (including those that are cached) correspond to data blocks presently stored in the deduplication storage system, meaning that fingerprints of overwritten (and hence no longer be valid) data are not retained in the fingerprint index.

U.S. Pat. No. 9,069,786B2 discloses another technique for managing fingerprints that utilizes two or more fingerprint lookup tables to store fingerprints. In this approach, a first table stores fingerprints that are more likely to be encountered, and a second (and any additional) tables store fingerprints that less likely to be encountered. Based on this categorization, inline deduplication is performed for those fingerprints likely to be encountered, and background deduplication is performed for those fingerprints less likely to be encountered. In order to determine which tables should be searched, attributes indicating how much effort to put into inline deduplication are associated with data chunks or groups of data chunks.

BRIEF SUMMARY

In at least one embodiment, a controller of a data storage system generates fingerprints of data blocks written to the data storage system. The controller maintains, in a data structure, respective state information for each of a plurality of data blocks. The state information for each data block can be independently set to indicate any of a plurality of states, including at least one deduplication state and at least one non-deduplication state. At allocation of a data block, the controller initializes the state information for the data block to a non-deduplication state and, thereafter, in response to detection of a write of duplicate of the data block to the data storage system, transitions the state information for the data block to a deduplication state. The controller selectively performs data deduplication for data blocks written to the data storage system based on the state information in the data structure and by reference to the fingerprints.

BRIEF DESCRIPTION OF THE SEVERAL VIEWS OF THE DRAWINGS

FIG. 2 depicts an example of data deduplication in accordance with one embodiment;

FIG. 3 is a more detailed view of the address mapping data structure of FIG. 1C in accordance with one embodiment;

FIG. 7B is a state diagram illustrating management of an array block state (ABS) and fingerprint state (FPS) of a block of a storage array in accordance with an embodiment in which ghost fingerprints are lazily maintained in both memory and the bulk storage media;

DETAILED DESCRIPTION

Figure 1A:
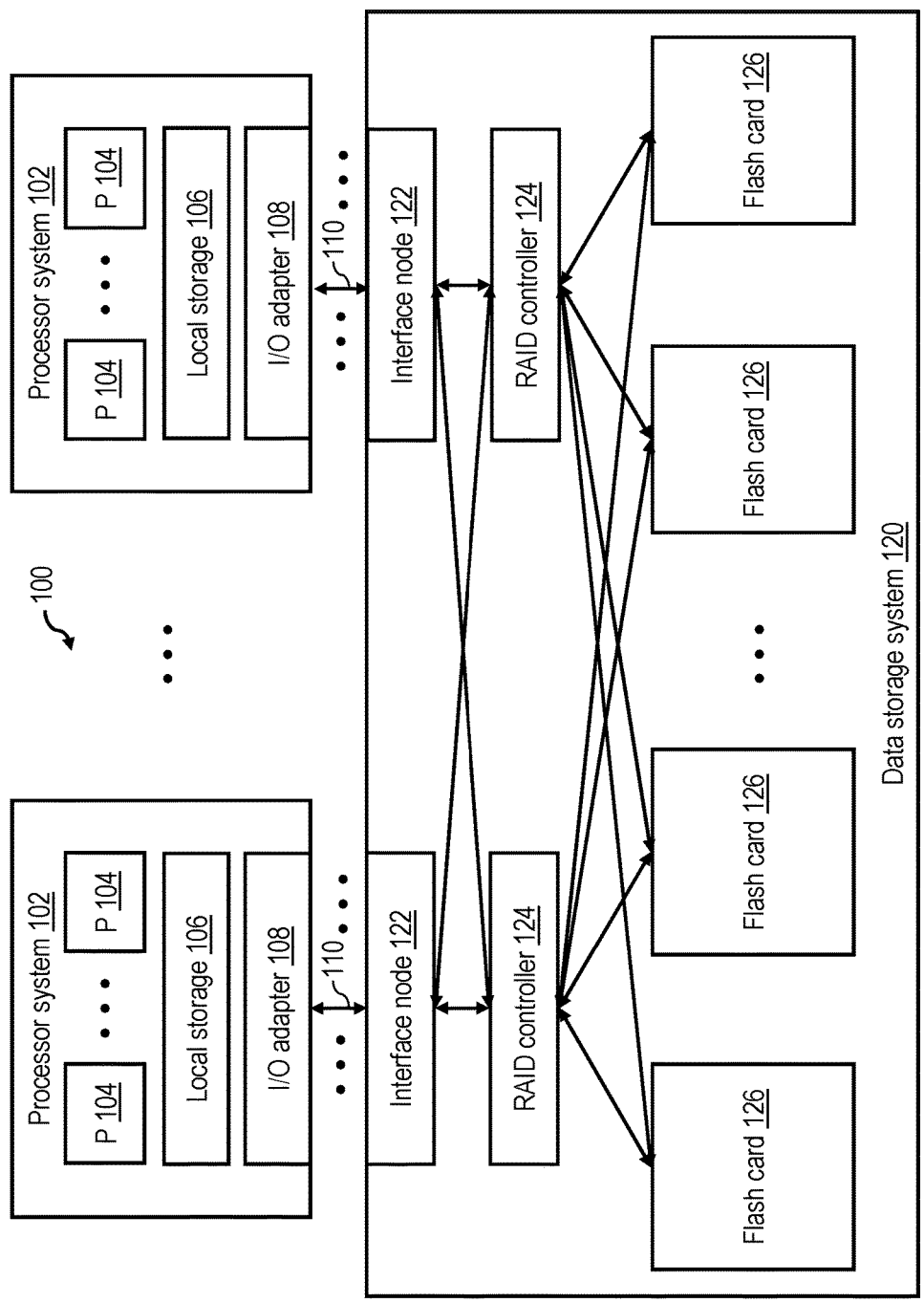
FIG. 1A is a high level block diagram of a data processing environment in accordance with one embodiment.

With reference now to the figures and with particular reference to FIG. 1A, there is illustrated a high level block diagram of an exemplary data processing environment 100 including a NAND flash-based data storage system and a controller configured to perform data deduplication according to the present disclosure. It will be appreciated upon review of the following description that the specific architectural details of data processing environment 100 provided herein do not necessarily limit the inventions disclosed herein and that the disclosed inventions are applicable to other data processing environments, including those employing alternative or additional bulk storage media.

In the illustrated example, data processing environment 100 includes one or more hosts, such as a processor system 102 having one or more processors 104 that process instructions and data. Processor system 102 may additionally include local storage 106 (e.g., dynamic random access memory (DRAM) or disks) that may store program code, operands and/or execution results of the processing performed by processor(s) 104. In various embodiments, processor system 102 can be, for example, a mobile computing device (such as a smartphone or tablet), a laptop or desktop personal computer system, a server computer system (such as one of the POWER® series available from International Business Machines Corporation), or a mainframe computer system. Processor system 102 can also be an embedded processor system using various processors such as ARM®, POWER, Intel X86, or any other processor combined with memory caches, memory controllers, local storage, I/O bus hubs, etc.

Each processor system 102 further includes an input/output (I/O) adapter 108 that is coupled directly (i.e., without any intervening device) or indirectly (i.e., through at least one intermediate device) to a data storage system 120 via an I/O channel 110. In various embodiments, an I/O channel 110 may employ any one or a combination of known or future developed communication protocols, including, for example, Fibre Channel (FC), FC over Ethernet (FCoE), Internet Small Computer System Interface (iSCSI), InfiniBand, Transport Control Protocol/Internet Protocol (TCP/IP), Peripheral Component Interconnect Express (PCIe), etc. I/O operations (IOs) communicated via I/O channel 110 include read IOs by which a processor system 102 requests data from a data storage system 120 and write IOs by which a processor system 102 requests storage of data in data storage system 120.

In the illustrated embodiment, data storage system 120 includes multiple interface nodes 122 through which data storage system 120 receives and responds to IOs via I/O channels 110. Each interface node 122 is coupled to each of multiple Redundant Array of Inexpensive Disks (RAID) controllers 124 in order to facilitate fault tolerance and load balancing. There may be one, two, or more than two interface nodes 122 in a data storages system 120 and interface nodes may communicate directly with each other within as well as across data storage systems 120 (e.g., by a PCIe bus). Each of RAID controllers 124 is in turn coupled (e.g., by a PCIe bus) to each of multiple flash cards 126 including, in this example, NAND flash storage media. In other embodiments, other storage media can be employed in addition to or in place of the NAND flash storage media.

Figure 1B:
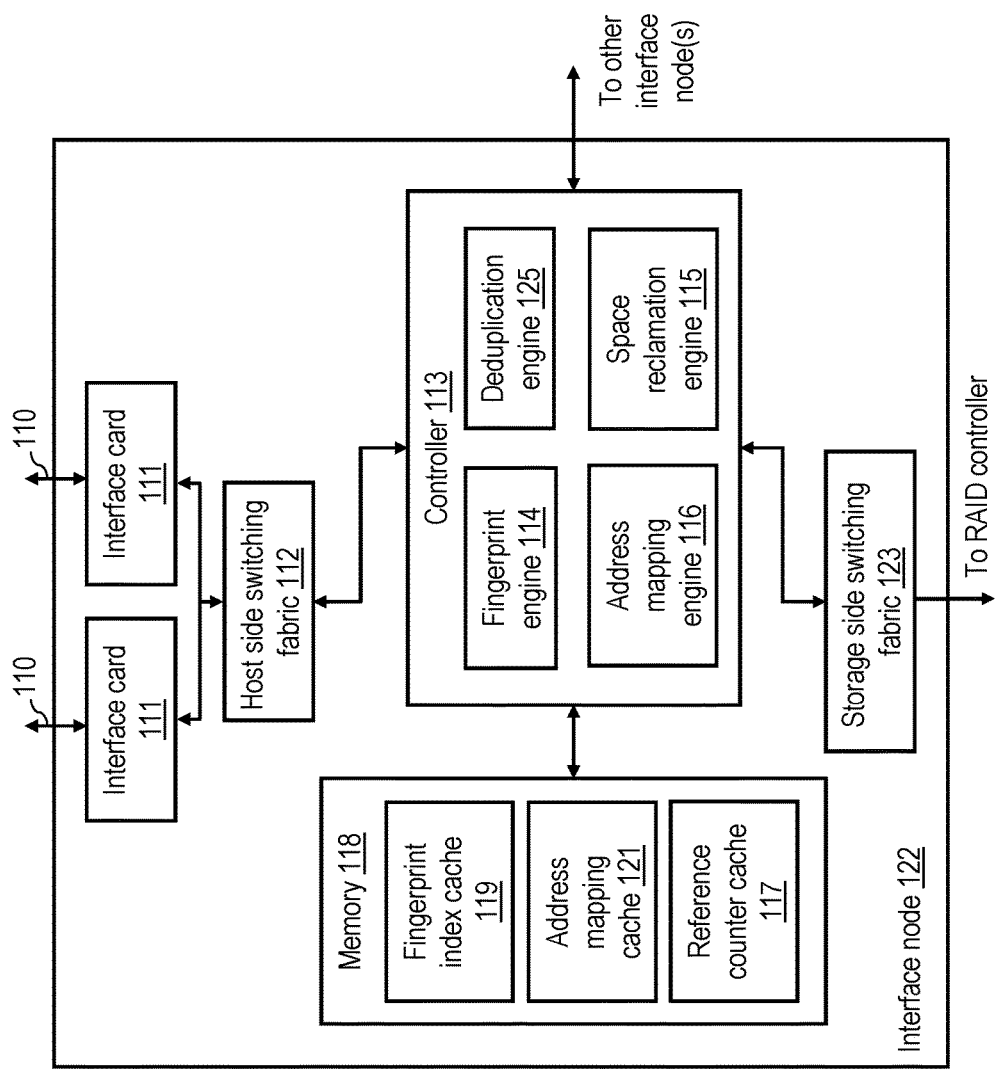
FIG. 1B is a more detailed block diagram of an exemplary interface node of the data storage system depicted in FIG. 1A.

FIG. 1B depicts a more detailed block diagram of an exemplary embodiment of an interface node 122 of data storage system 120 of FIG. 1A. In the illustrated embodiment, interface node 122 includes one or more interface cards 111 that serve as an interface to processor systems 102 through I/O channels 110 and connect to a host side switching fabric 112, which can be implemented, for example, by a Peripheral Component Interconnect express (PCIe) switch or other suitable switch. Host side switching fabric 112 transfers data between interface cards 111 and one or more processors within interface node 122, which are collectively illustrated in FIG. 1B as controller 113. The processor(s) forming controller 113 can be implemented with general-purpose processor(s) and/or special-purpose processor(s), such as Application Specific Integrated Circuits (ASICs) or Field Programmable Gate Arrays (FPGAs)). In the case multiple processors are implemented within controller 113, one or more of the processors may be dedicated for data plane processing, and one or more processors may be dedicated for control plane processing. Controller 113 is coupled to a memory 118 (e.g., DRAM or magneto-resistive random access memory (MRAM)), which may be implemented as a unified memory or as multiple different memories. Memory 118 holds a fingerprint index cache 119, address mapping cache 121, and reference counter cache 117 among other data structures. Note, that the fingerprint index, address mapping table, and reference counters may fit entirely or only partially in these caches. Each data type may be stored separately (as shown in FIG. 1B) and/or collocated in a dedicated data structure in memory 118. Controller 113 is additionally coupled to RAID controllers 124 through storage side switching fabric 123, which can be implemented with a PCIe switch or other switch technology. Controller 113 is further coupled to one or more other interface nodes 122 in data storage system 120 to handle fail-over scenarios or to perform other data synchronization functions or delegation/redirection of deduplication operations.

Figure 1C:
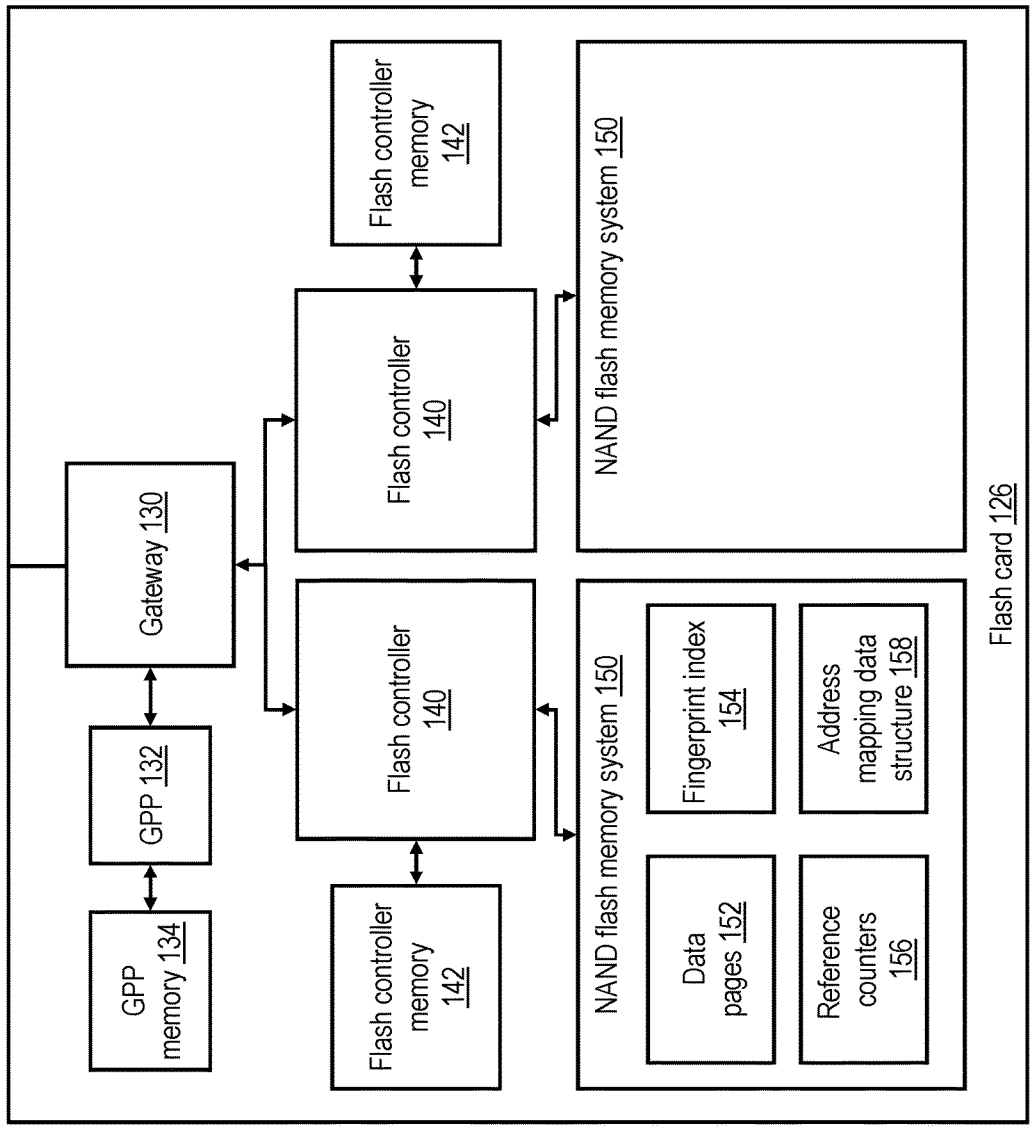
FIG. 1C is a more detailed block diagram of an exemplary flash card of the data storage system illustrated in FIG. 1A.

FIG. 1C illustrates a more detailed block diagram of a flash card 126 of data storage system 120 of FIG. 1A. Flash card 126 includes a gateway 130 that serves as an interface between flash card 126 and RAID controllers 124. Gateway 130 is coupled to a general-purpose processor (GPP) 132, which can be configured (e.g., by program code) to perform various management functions, such as garbage collection, wear-leveling, data placement decisions for future writes, pre-processing of IOs received by gateway 130 and/or scheduling servicing of the IOs by flash card 126. GPP 132 is coupled to a GPP memory 134 (e.g., DRAM or MRAM) that can conveniently buffer data created, referenced and/or modified by GPP 132 in the course of its processing.

Gateway 130 is further coupled to one or more flash controllers 140, each of which controls a respective NAND flash memory system 150. Flash controllers 140 can be implemented, for example, by an ASIC or a FPGA having an associated flash controller memory 142 (e.g., DRAM). In embodiments in which flash controllers 140 are implemented with an FPGA, GPP 132 may program and configure flash controllers 140 during start-up of data storage system 120. After startup, in general operation flash controllers 140 receive read and write IOs from gateway 130 that request to read data stored in NAND flash memory system 150 and/or to store data in NAND flash memory system 150. Flash controllers 140 service these IOs, for example, by accessing NAND flash memory systems 150 to read or write the requested data from or into NAND flash memory systems 150 or by accessing one or more read and/or write caches (not illustrated in FIG. 1C) associated with NAND flash memory systems 150.

Flash controllers 140 implement a Flash Translation Layer (FTL) that provides logical-to-physical address translation to enable access to specific memory locations within NAND flash memory systems 150. In general, an IO received by flash controller 140 indicates the logical block address (LBA) at which the data is to be accessed (read or written) and, if a write IO, the write data to be written to data storage system 120. The IO may also specify the amount (or size) of the data to be accessed. Other information may also be communicated depending on the protocol and features supported by data storage system 120. As is known to those skilled in the art, NAND flash memory, such as that employed in NAND flash memory systems 150, is constrained by its construction such that the smallest granule of data that can be accessed by a read or write IO is fixed at the size of a single flash memory page, for example, 16 kilobytes (kB). The LBA indicated by the host device corresponds to a logical page within a logical address space, the logical page typically having a size of four kilobytes. As such, more than one logical page may be stored in a physical flash page. The FTL translates this LBA into a physical address assigned to a corresponding physical location in a NAND flash memory system 150. As shown, NAND flash memory systems 150 may store data pages 152 containing user data, as well as management metadata structures, such as a fingerprint index 154, reference counters 156, and address mapping data structure 158.

Referring now to both FIGS. 1B and 1C, controller 113 of interface node 122 preferably provides system management functions, as well as higher level services such as snapshots, thin provisioning, and deduplication. To provide deduplication, controller 113 implements a fingerprint engine 114 that generates fingerprints for data blocks that are to be written to flash cards 126. The fingerprints computed by fingerprint engine 114 are preferably cryptographic hashes that provide collision resistance, cannot be inverted, and cannot manufacture collisions. Examples of suitable functions that can be employed by fingerprint engine 114 to generate fingerprints include SHA-1 and SHA-2 (SHA-2 includes any of SHA-224, SHA-256, SHA-384, SHA-512, SHA-512/224, and SHA-512/256). In general, the volume of the fingerprints generated by fingerprint engine 114 is many times larger than the storage capacity of memory 118. Consequently, controller 113 stores the fingerprints generated by fingerprint engine 114 in fingerprint index 154 (see, FIG. 1C) in flash cards 126 and caches only a subset of the fingerprints in a fingerprint index cache 119 in memory 118. For example, in one embodiment, controller 113 caches "hot" (i.e., frequently encountered) fingerprints in fingerprint index cache 119 and holds colder fingerprints only in fingerprint index 154. The fingerprints may alternatively or additionally be segregated between fingerprint index cache 119 and fingerprint index 154 based on one or more additional criteria, such as the type, state, or source (client or volume) of the fingerprints.

Controller 113 additionally includes an address mapping engine 116 that maps input block addresses referenced in read and write IOs received from hosts such as processor systems 102 into output block addresses employed internally within data storage system 120. For example, in some embodiments, the input block addresses reference logical blocks of a logical storage volume, and the output block addresses are array block addresses referencing blocks of the storage array within data storage system 120. (In some literature, the array blocks are referred to as "physical" blocks, although as noted above in reality further translation is generally performed by lower level storage controllers (e.g., flash controllers 140) in order to address physical storage locations in the storage media.) These array blocks may be, for example, 4, 8, or 16 kB in size. In the depicted embodiment, address mapping engine 116 maps between the input and output block addresses by reference to address mapping data structure 158 (see, FIG. 1C). For quick reference, address mapping engine 116 may cache frequently referenced address translations in an address mapping cache 121 in memory 118. Address mapping engine 116 maintains a set of reference counters 156 (see, FIG. 1C) in flash cards 126 including a respective reference counter 156 for each block in the output address space and caches only a subset of the reference counters in the reference counter cache 117. Reference counter cache 117 may be inclusive or exclusive of the entries in reference counters 156. Each reference counter 156 tracks how many times the corresponding block of the output address space is referenced in the storage array.

Controller 113 also includes a deduplication engine 125 that executes the search for duplicates upon incoming writes or during background deduplication. When a duplicate is found, the deduplication engine 125 uses the address mapping engine 116 to update address mapping data structures 158 and reference counters 156 including the potentially cached copies in the address mapping cache 121 and the reference counter cache 117. When the new write IO is not a duplicate, deduplication engine 125 inserts the fingerprint generated by the fingerprint engine 114 into the fingerprint index 154 directly and/or into the fingerprint index cache 119.

Controller 113 further includes a space reclamation engine 115 (also referred to as a garbage collection engine). Space reclamation engine 115 reclaims blocks of the output address space (i.e., array blocks) that are logically invalid and/or no longer referenced (e.g., those for which the associated reference counter in the stored reference counters 156 and/or the reference counter cache 117 has a value of zero) and removes the associated unneeded fingerprints from fingerprint index 154 and fingerprint index cache 119, and if needed, any stale mapping information from address mapping data structure 158. In addition, space reclamation engine 115 may further manage the promotion of fingerprints (e.g., "hot" fingerprints) from fingerprint index 154 to fingerprint index cache 119 and the demotion of fingerprints (e.g., "colder" fingerprints) from fingerprint index cache 119 to fingerprint index 154.

It should be noted at this point that the fingerprint index cache 119, the address mapping cache 121, and the reference counter cache 117 in memory 118 may be organized into separate read and write caches. Hence updates in the write caches may not immediately be stored in the NAND flash memory system 150 but rather be lazily destaged depending on the cache replacement policy used.

It should be appreciated that in other embodiments the deduplication performed by the deduplication engine 125 in controller 113 can alternatively or additionally be performed at other levels within the data processing environment shown in FIG. 1A. For example, these functions can be implemented at a lower level of the storage hierarchy, such as in RAID controller 124 or in flash cards 126, or at a higher level of the storage hierarchy, such as in a storage area network controller (e.g., one of processor systems 102) that controls multiple data storage systems 120. In general, it is preferable for the fingerprint generation and deduplication functions to be performed at a controller at as high a level as possible within the storage hierarchy having visibility to potentially duplicate data and thus achieve the greatest savings in storage capacity and wear from deduplication. Regardless of the level of storage hierarchy at which fingerprint generation and deduplication are implemented, these functions are preferably performed in-line rather than in a background process (although background deduplication is employed in some embodiments, as discussed below). For generality, the logic that performs fingerprint generation and data deduplication is referred to herein as a "controller," and is defined to include hardware logic (e.g., a general-purpose processor, ASIC, FPGA or other integrated circuitry), which is configured in hardware and/or by firmware and/or software to perform the data deduplication and fingerprint management described herein.

Referring now to FIG. 2, an example of data deduplication in accordance with one embodiment is depicted. In this example, a data storage system, such as data storage system 120 of FIGS. 1A-1C, receives one or more write IOs directing data storage system 120 to store user data 200 including files 202a and 202b. File 202a includes data blocks A, B, C. D, E, C (i.e., data block C is duplicated in file 202a), and file 202b includes data blocks A, F, B, and G (i.e., data blocks A and B are duplicated between files 202a and 202b). In response to receipt of write IOs specifying storage of the data blocks comprising files 202a-202b, fingerprint engine 114 generates a respective fingerprint of each data block, and deduplication engine 125 determines whether or not the generated fingerprint matches an existing fingerprint in fingerprint index 154 (including fingerprint index cache 119). If not, deduplication engine 125 installs a new fingerprint entry for the data block in fingerprint index 154 (and/or fingerprint index cache 119). In addition, address mapping engine 116 performs address mapping for the input block address (e.g., a volume block address) to obtain an output block address (e.g., an array block address or logical block address), and controller 113 passes the store data and output block address to a flash card 126 to initiate storage of the data block in the storage array 204 formed by flash cards 126. In this manner, blocks A-G, when first encountered by controller 113, are written to storage array 204. However, when controller 113 encounters a duplicate data block as indicated by the presence of a matching fingerprint in fingerprint index 154, controller 113 commands a flash card 126 to store, at the relevant output block address in the address mapping data structure 158 (which may also reside in the address mapping cache 121) determined by address mapping engine 116, a pointer to the existing copy of the data block in lieu of storing a duplicate of the data block. Thus, as indicated in FIG. 2, the storage array 204 formed of flash cards 126 stores only a single copy of each of data blocks A-G and additionally stores pointers to blocks A, B and C in place of duplicate copies of these blocks.

The data deduplication generally illustrated in FIG. 2 can result in significant savings in storage capacity as well as reduction of wear on flash cards 126 that would be caused by writing duplicate blocks of user data to the NAND flash storage media. However, data deduplication has attendant costs in terms of metadata storage and processing overhead that, if not handled appropriately, can impair or even outweigh the benefits achieved by data deduplication. For example, conventional NAND flash-based storage systems that implement data deduplication typically invalidate and remove from storage fingerprints of overwritten data blocks which are no longer referenced. In the most straight-forward implementation, each input block address mapping entry has a pointer to a <fingerprint, array block address, reference counter> tuple that is part of a fingerprint index structure. Such a design, however, requires frequent metadata updates at every user IO and is efficient only in the case where all or most metadata resides in DRAM (or in a medium with similar fast random-access characteristics). The memory requirement becomes impractical as the DRAM size scales with the storage capacity (e.g., 4 TB of DRAM are required to store the metadata for 1 PB of storage) to hold the metadata. In storage systems that do not have enough DRAM to cache most metadata, a different design with better scalability properties is desirable where the address mapping, fingerprints, and reference counters are stored in separate metadata structures (e.g., FIG. 1C). This decoupling allows for a reduction in metadata IO and enables more efficient caching of metadata based on type and utilization. In comparison with the straight-forward design, only the address mapping table has to be made persistent. For example, the reference counters can be reconstructed by traversing the address mapping table, while the fingerprints can be inserted and removed in bulk as any fingerprint can be reconstructed by scanning the stored data. By lazily maintaining the reference counters and the fingerprints outside of the IO path, the additional IO required to maintain metadata is reduced. An additional benefit of such a scalable design is that it allows for targeted and efficient caching of metadata in DRAM based on their type, frequency of accesses, etc. For example, the address mapping table is amenable to temporal and special locality, while fingerprints insertions and lookups are not. This can be exploited by caching the address mapping table with the highest priority, while caching only some fingerprints for frequent duplicate data. However, a drawback of designs where the fingerprint metadata is separated from the address translation metadata is that invalid fingerprints cannot be immediately removed without maintaining a reverse lookup capability that maps array blocks to fingerprints. A reverse lookup capability would generate a comparable amount of metadata as for the fingerprint index, increase the metadata IO and storage overhead, and defeat the goal of reducing the DRAM and IO overhead of the scalable design. However, the absence of a reverse lookup capability leads to additional complexity for space reclamation in response to blocks becoming logically invalid as the associated invalidated fingerprints have to be cleaned up in the background (garbage collected) before the blocks can be reused.

In accordance with the present disclosure, high I/O throughput is achieved for inline data deduplication of random writes of unique data with low deduplication overhead and low latency through intelligent management by a controller (e.g., controller 113) of array block states and associated fingerprint metadata. The disclosed management of array block states and fingerprint metadata reduces overhead of frequently performed deduplication-related operations with the tradeoff of adding additional processing overhead to less frequently performed operations. As a starting point, analysis of workloads of data storage system reveals that some typical workloads contain a larger fraction of unique data blocks, even in cases in which many data blocks are duplicated. Consequently, the processing overhead attributable to deduplication (e.g., out-of-place write semantics, additional metadata updates, garbage collection of overwritten data blocks) can be reduced by performing such processing only when writing to the data storage system data blocks that will have duplicates (i.e., write workloads with many duplicates) and not when writing unique data blocks that only has few duplicates (i.e., deduplication averse write workloads). For example, consider a dataset including 100 logical blocks of which 10 are unique and in which the first logical block has 91 logical copies. With inline deduplication, these 100 logical blocks will be reduced to 10 unique blocks and thus only 10 physical blocks will be stored. In this example, 9/10 of the physical blocks (90%) do not need to incur any deduplication-related overhead even though the data reduction achieved through deduplication is very high (10:1). Further, workload analysis reveals that unique blocks can generally be expected to be updated more frequently than duplicated blocks (e.g., duplicates blocks are often cold data or even read-only data). Therefore, continuing the previous example, after the first 100 logical blocks are written, the workload may be composed of updates only to the unique data blocks. In this case, the deduplication ratio always remains constant, even though all of the incoming writes do not need to incur any deduplication-related overhead. On the other hand, workloads that exhibit duplicates do not typically see overwrites before a duplicate is detected (i.e., assuming that no longer used addresses are properly being trimmed). Therefore it is beneficial to treat data blocks that have been written for the first time differently such that, upon a duplication being found, the overhead from executing the deduplication-related operations is significantly reduced.

In view of the foregoing observations, the present disclosure preferably supports the ability to utilize metadata to distinguish between unique and duplicated data blocks. In at least one embodiment, all incoming data blocks are initially considered unique blocks for which at least some deduplication-related overhead can be avoided. Fingerprints for incoming writes can be generated and then lazily maintained in fingerprint metadata structure(s). Due to the lazy management of fingerprints, fingerprints for a unique data block can be either verified or unverified, where unverified fingerprints that may or may not represent the signature of the current state of the associated data block are defined herein as "ghost fingerprints." Ghost fingerprints can thus be considered as a tentative fingerprint entry. Presence of a ghost fingerprint indicates that the controller implementing deduplication has previously received the associated data block, but does not indicate whether or not the data block is unmodified or duplicated. For any given block, multiple ghost fingerprints may be present in the fingerprint index, but at most one ghost fingerprint can be present that actually represents the stored data block. Maintaining ghost fingerprints involves less processing overhead than maintaining valid fingerprints for frequently updated data blocks, as stale ghost fingerprints will be dropped lazily without incurring any metadata IO. In at least some embodiments, the fingerprint length and/or fingerprint computation method differs based on the fingerprint type. As one example, verified fingerprints can be longer and thus have a lower false positive rate, while ghost fingerprints can be shorter and thus more space efficient.

With reference now to FIG. 3, there is illustrated a more detailed view of address mapping data structure 158 of FIG. 1C in accordance with one embodiment. In the depicted embodiment, address mapping data structure 158 includes a multiplicity of address metadata (MD) pages 300, each including a metadata page header 302 and multiple address translation entries 304. In the illustrated example, each address translation entry 304 associates an input block address (e.g., a logical volume block address) with an output block address (e.g., array block address) output by address mapping engine 116. In addition, in a preferred embodiment, each of address translation entries 304 includes an additional metadata field referred to herein as array block state (ABS), which is described in greater detail below with reference to FIGS. 5-9. As further shown in FIG. 3, when queried by address mapping engine 116 with an input block address having a match in address mapping data structure 158, address mapping data structure 158 returns the associated output block address and the ABS. Address mapping data structure 158 may be organized into a tree structure, a hash map or any other convenient data structure that facilitates lookup operations. Further, the input and output block addresses may be organized in terms of address ranges. In case data is compressed before stored in an array block, the address mapping data structure may also include the compressed size and/or other additional meta-data preferably associated with the address entries (e.g., cyclic redundancy check value).

Figure 4:
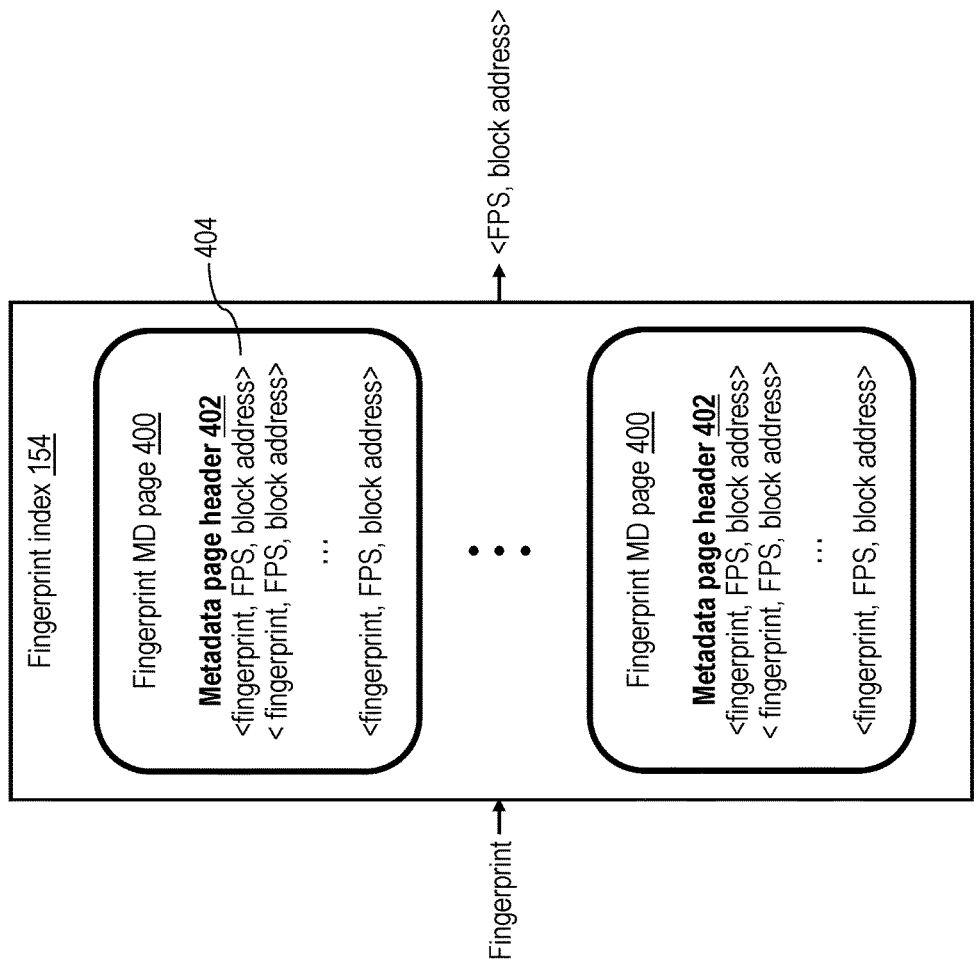
FIG. 4 is a more detailed view of the fingerprint index of FIG. 1C in accordance with one embodiment.

Referring now to FIG. 4, there is depicted a more detailed view of fingerprint index 154 in accordance with one embodiment. In the illustrated embodiment, fingerprint index 154 includes a multiplicity of fingerprint metadata (MD) pages 400, each including a metadata page header 400 and multiple fingerprint entries 402. In the illustrated example, each fingerprint entry 402 takes the form of a tuple associating a fingerprint determined by fingerprint engine 114 with a block address, which can be, for example, the input block address (e.g., logical block address or client block address) received as an input by address mapping engine 116 or the output block address (e.g., array block address) output by address mapping engine 116. The fingerprint MD pages may be organized into a tree structure, a hash map or any other convenient data structure that facilitates lookup operations. Other additional meta-data preferably associated with the fingerprint entries may be stored in the fingerprint index 154 (e.g., volume ID, age, size of the data block. etc.).

Further, in a preferred embodiment, some of fingerprint entries 402 employ one type of address while others employ the other type of address (e.g., ghost fingerprints may be associated with logical volume block addresses while valid fingerprints are associated with array block addresses). The tuple further includes an explicit indication of a fingerprint state (FPS), which indicates whether or not the fingerprint entry 202 is verified or unverified (i.e., a ghost fingerprint). The FPS may also include a bit indicating if this fingerprint is the first fingerprint that had been created for this block address. (This information may alternatively or additionally be stored in the ABS.) As indicated above, for lookup efficiency and to reduce the size of fingerprint index 154, in at least some embodiments fingerprint index 154 preferably only supports forward lookups, such that an access to fingerprint index 154 specifying a fingerprint returns the associated block address (assuming the access results in a hit in fingerprint index 154) and FPS. Individual ones of fingerprint metadata pages 400 can be paged into and out of fingerprint index cache 119 as needed or desired.

In storage systems that employ a large amount of memory or in storage systems where other performance tradeoffs are preferred, the fingerprint index can be implemented in other ways without affecting the deduplication process. For example, in one preferred embodiment, the fingerprint MD pages are part of a hash table that allows a different tradeoff between fingerprint insert performance and fingerprint lookup performance. In another embodiment, fingerprints are stored in separate index structures based on their type. For example, verified fingerprints can be stored in a dedicated index that is searched first for matches and is given priority for caching in fingerprint index cache 119, while ghost fingerprints are stored in a separate index that is searched only if the first index does not produce a match.

Figure 5:
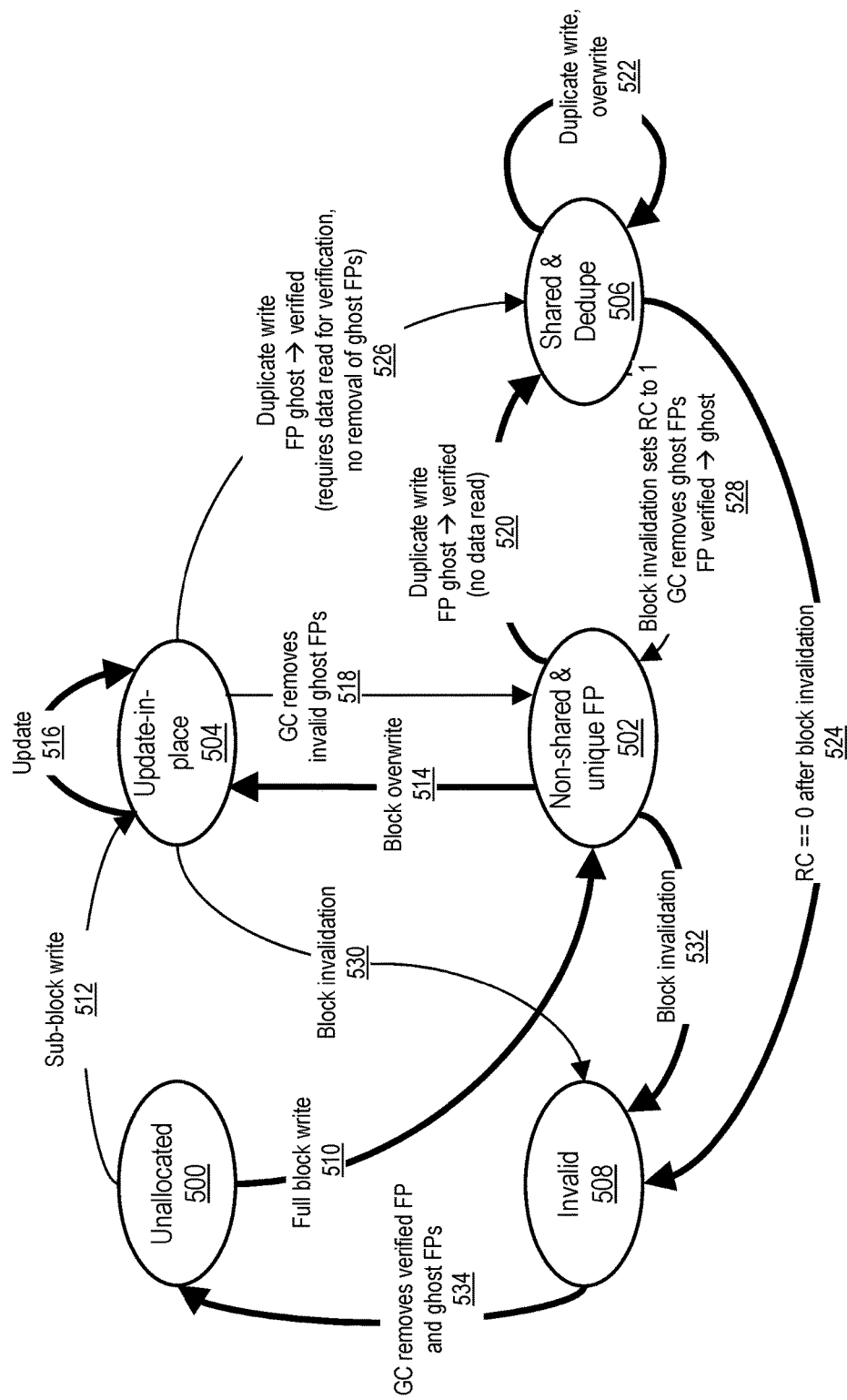
FIG. 5 is a state diagram illustrating management of an array block state (ABS) and fingerprint state (FPS) of a block of a storage array in accordance with one or more embodiments.

With reference now to FIG. 5, there is illustrated a state diagram illustrating management of the array block state (ABS) and fingerprint state (FPS) of a block of a storage array in accordance with one or more embodiments. The management process represented by this state diagram can be performed by a controller of a data storage system, which for the purposes of the following description will be assumed to be controller 113 of FIG. 1B. More common state transitions in this and the other state diagrams given herein are indicated by heavyweight lines, and less common state transitions are indicated by lightweight lines.

In the embodiment of FIG. 5, the ABS of an array block can be in any of five states, including Unallocated state 500, Non-shared and Unique Fingerprint state 502, Update-in-place state 504, Shared and Dedupe state 506, and Invalid state 508. Each array block of a storage array begins in Unallocated state 500, which signifies that the array block address of the array block is not associated with a volume block address in address mapping data structure 158 and that the array block does not have any associated fingerprint stored in fingerprint index 154 or fingerprint index cache 119. An unallocated array block may hence be implemented in a way that no storage physical storage spaces is used in flash cards 126. The ABS of an array block transitions from Unallocated state 500 to either Non-shared and Unique Fingerprint state 502 or Update-in-place state 504 in response to controller 113 receiving a write IO. As shown at reference numeral 510, in the most common case in which the write IO specifies a full array block of write data (e.g., 4 kB, 8 kB, 16 kB, or a multiple thereof), controller 113 allocates one or more array blocks for storing the write data via address mapping data structure 158, creates one or more address mapping entries in address mapping data structure 158 for each of the array blocks, increments the relevant reference counter in the stored reference counters 156 and/or the reference counter cache 117 to a value of 1, and sets the ABS for the address translation entry to Non-shared and Unique Fingerprint state 502. As shown at reference numeral 512, in the less common case in which the write IO specifies less than a full array block of write data (e.g., smaller than 4 kB), controller 113 performs similar processing, but sets the ABS for the address translation entry to Update-in-place state 502 instead of Non-shared and Unique Fingerprint state 502. In this case, the actual write operation may be performed in a read-modify-write sequence in some embodiments. In either case, when an array block is initially allocated, controller 113 sets ABS to a non-deduplication state in which data deduplication is not performed and sets the FPS of the array block to the unverified state. In embodiments that store ghost fingerprints in the index cache 119 only, the FPS may be associated to the index cache 119 and hence only stored there. Note that in some embodiments, a sub-block write 512 may result in no fingerprint being created and therefore no FPS has to be set. In the case of an array block in Non-shared and Unique Fingerprint state 502, it is known that only a single unique fingerprint, namely, a ghost fingerprint, resides in fingerprint index 154 or fingerprint index cache 119; an array block in Update-in-place state 504 can have one or more associated ghost fingerprints in the fingerprint index 154 or fingerprint index cache 119, but only one of these actually represents the data of array block (i.e., is valid) and all the others, if present, are invalid. Clearly, in embodiments that do not create a fingerprint upon a sub-block write 512 there may even be no fingerprint in the Update-in-place 504 state. In other words, there may be at most one fingerprint actually representing the data of the array block (i.e., the ghost fingerprint is valid) and all the others, if present, are invalid.

Note that for a duplicate write to unallocated space a fresh array block may be allocated or not. In case the detection of the duplicate is performed entirely inline (i.e., before the write is acknowledged to the processor system 102), no allocation of an array block is needed. When the write IO is acknowledged before the deduplication engine 125 detects a duplicate, data may have to be made persistent before the actual deduplication and therefore require an array block to be allocated. The same is valid for updates with duplicate data to allocated space that map to existing array blocks in the Shared and Dedupe state 506.

Controller 113 transitions the ABS of an array block from Non-shared and Unique Fingerprint state 502 to Update-in-place state 504 in response to either a partial or full update of the array block, as shown at reference numeral 514. As indicated at reference numeral 516, controller 113 similarly retains an array block in Update-in-place state 504 in response to either a partial or full update of the array block. Note that a partial block overwrite at reference numeral 514 as well as a partial update write at reference numeral 516 may not include the creation of a new (ghost) fingerprint in some embodiments. It will be appreciated that while NAND flash memory systems 150 do not physically permit in-place update of data pages 152, from the logical view of controller 113 in-place updates are permitted for array blocks. Therefore, in-place updates can be done in non-deduplication states 502 and 504. Controller 113 transitions the ABS of the array block from Update-in-place state 504 to Unique Fingerprint state 502 as shown at reference numeral 518 in response to the garbage collection performed by space reclamation engine 115 optionally removing either all of the unverified (i.e., ghost) fingerprints or all invalid ghost fingerprints (i.e., retaining only the single ghost fingerprint that corresponds to the data being stored in the array block if such a ghost fingerprint exists) for the array block from fingerprint index 154 or fingerprint index cache 119. The ABS may for this purpose maintain a counter representing the number of overwrites seen, and the counter may further be stored in the FPS in order to facilitate the detection of the last fingerprint created for the array block. In preferred embodiments that do not implement a reverse lookup capability for fingerprints in the fingerprint index cache 119, such garbage collection requires controller 113 to read the data of the array block from flash cards 126 and generate a fingerprint to perform lookups in fingerprint index cache 119.

Controller 113 transitions the ABS of an array block from Non-shared and Unique Fingerprint state 502 to Shared and Dedupe state 506 (in which inline deduplication is performed for the array block) in response to receipt of a write IO specifying the write of a full data block for which a matching ghost fingerprint is found in fingerprint index 154 (reference numeral 520). Note that the transition does not require a verification of the fingerprint because the matching fingerprint is the only fingerprint for this array block. Therefore the deduplication overhead is minimized for the transition indicated by reference numeral 520. In addition to updating the ABS, controller 113 also increments the reference counter in the stored reference counters 156 and/or the reference counter cache 117 for the array block and updates the FPS of the associated fingerprint in fingerprint index 154 from unverified (i.e., a ghost fingerprint) to verified. Depending on the implementation of the FPS, controller 113 may further adapt the array block address in the FPS from an input block address to an output block address or vice versa. Controller 113 also transitions the ABS of an array block to Shared and Dedupe state 506 from Update-in-place state 504 in response to receipt of a write IO specifying the write of a full data block for which a matching ghost fingerprint is found in fingerprint index 154 (reference numeral 526). In this case, controller 113 must also verify if the matching ghost fingerprint is the valid one (and update its FPS accordingly), for example, by reading the data of the array block from flash cards 126 and then either directly comparing the array block data to the write data or indirectly comparing them via a fingerprint match. Only when this verification is successful does controller 113 transition the ABS of the array block to Shared and Dedupe state 506. If the verification is not successful, the existing array block remains in Update-in-place state 504, the write will be handled as a full block write 510 (for which a new array block has to be allocated), and no deduplication is performed. Although this verification operation is computationally expensive, it is infrequently performed and therefore does not create a significant negative impact on the overall system performance. Additionally, the invalid ghost fingerprint is preferably removed from the fingerprint index cache 119 and/or the fingerprint index 154. Other embodiments may handle the removal of ghost fingerprints lazily, and controller 113 preferably does not employ space reclamation engine 115 to remove unverified fingerprints for the array block from fingerprint index cache 119 in response to state transition 526. Thus, an array block having its ABS set to Shared and Dedupe state 506 has a reference count greater than or equal to one, a single associated verified fingerprint in fingerprint index 154, and possibly one or more associated ghost fingerprints in fingerprint index 154 and/or fingerprint index cache 119. While an array block is in Shared and Dedupe state 506, controller 113 incurs the full processing and meta-data storage overhead of deduplication for the array block, since it is presumed that an array block having at least one duplicate will likely have additional duplicates, rather than being overwritten. Further, controller 113 performs out of place writes for any overwrites of input blocks that map to the array block.

As indicated at reference numeral 522, controller 113 retains the ABS of an array block in Shared and Dedupe state 506 in response to receipt of a write IO specifying a duplicate block write or in response to an overwrite, a trim command, or a volume deletion that, upon update of the reference counter in the stored reference counters 156 and/or the reference counter cache 117, results in a reference count in the associated reference counter in the stored reference counters 156 and/or the reference counter cache 117 of at least one. If the overwrite, trim or volume deletion results in a zero value of the reference counter, controller 113 transitions the ABS of the array block from Shared and Dedupe state 506 to Invalid state 508 (reference numeral 524). Controller 113 may transition the ABS of an array block from Shared and Dedupe state 506 to Non-shared and Unique Fingerprint state 502 in response to the value of the associated reference counter in the stored reference counters 156 and/or the reference counter cache 117 reaching one and the garbage collection performed by space reclamation engine 115 deciding to remove all of the ghost fingerprints for the array block from fingerprint index 154 (reference numeral 528). In this case, controller 113 additionally updates the FPS of the remaining fingerprint from verified to unverified. Transition from Shared and Dedupe state 506 to Non-shared and Unique Fingerprint state 502 indicates that further deduplication opportunities for the array block are unlikely.

As illustrated at reference numerals 530 and 532, controller 113 transitions the ABS of an array block from either Update-in-place state 504 or Non-shared and Unique Fingerprint state 502 to Invalid state 508 in response to a block invalidation (such as an overwrite or a trim command or volume deletion or a snapshot deletion that removes the array block from use). When an array block is in Invalid state 508, the block data and all associated fingerprint metadata are removed from use and are simply awaiting removal from address mapping data structure 158 (and address mapping cache 121) and fingerprint index 154 (and fingerprint index cache 119) by space reclamation engine 115. Once such garbage collection is performed, controller 113 sets the associated reference counter to a predefined unused value (e.g., to −1) and transitions the array block from Invalid state 508 to Unallocated state 500 (reference numeral 534).

Differing implementations of the general state diagram given in FIG. 5 can additionally be explored based upon specific architectural choices, such as the manner in which fingerprints are handled. Moreover, not all transitions presented in FIG. 5 need to be implemented. Only a subset of the state transitions are required such that the state diagram graph is connected (i.e., there is a path from any state to any other state either directly or indirectly through other states). Further, in some embodiments, the timing of the deduplication can be dependent upon the type of the fingerprint matched. As one example, verified fingerprints can be used for performing inline deduplication, while ghost fingerprints are used to perform background deduplication.

For example, a first class of implementations holds ghost fingerprints only in fingerprint index cache 119 and not in the fingerprint index 154 residing in the bulk storage (e.g., on the NAND flash media). In this implementation, it is possible to maintain in memory 118 a reverse lookup between block addresses and fingerprints to facilitate fast cleanup of invalid ghost fingerprints. However, given the fact that in practical systems, memory 118 will have a storage capacity much lower than the volume of fingerprints, ghost fingerprints will need to be garbage collected periodically. In addition, it may not be possible to perform exhaustive inline deduplication given the limited amount of ghost fingerprints in memory 118. In a second class of implementations, ghost fingerprints can be stored both in memory 118 and in the fingerprint index 154 residing in the bulk storage (e.g., on the NAND flash media). This arrangement typically entails verifying ghost fingerprints by reading data from the NAND flash media, as it is more difficult to remove ghost fingerprints when an array block is overwritten or deallocated. The description of FIG. 5 above is applicable to one implementation belonging to the first class of implementations. Another one is described below with reference to FIG. 6; additional implementations belonging to the second class of implementations are described below with reference to FIGS. 7A-7B and FIG. 8. Note that some embodiments may dynamically switch between these implementations depending on the available resources in the system (e.g., a reverse mapping may be initially maintained but later dropped when the fingerprint index cache 119 exceeds a certain limit).

Figure 6:
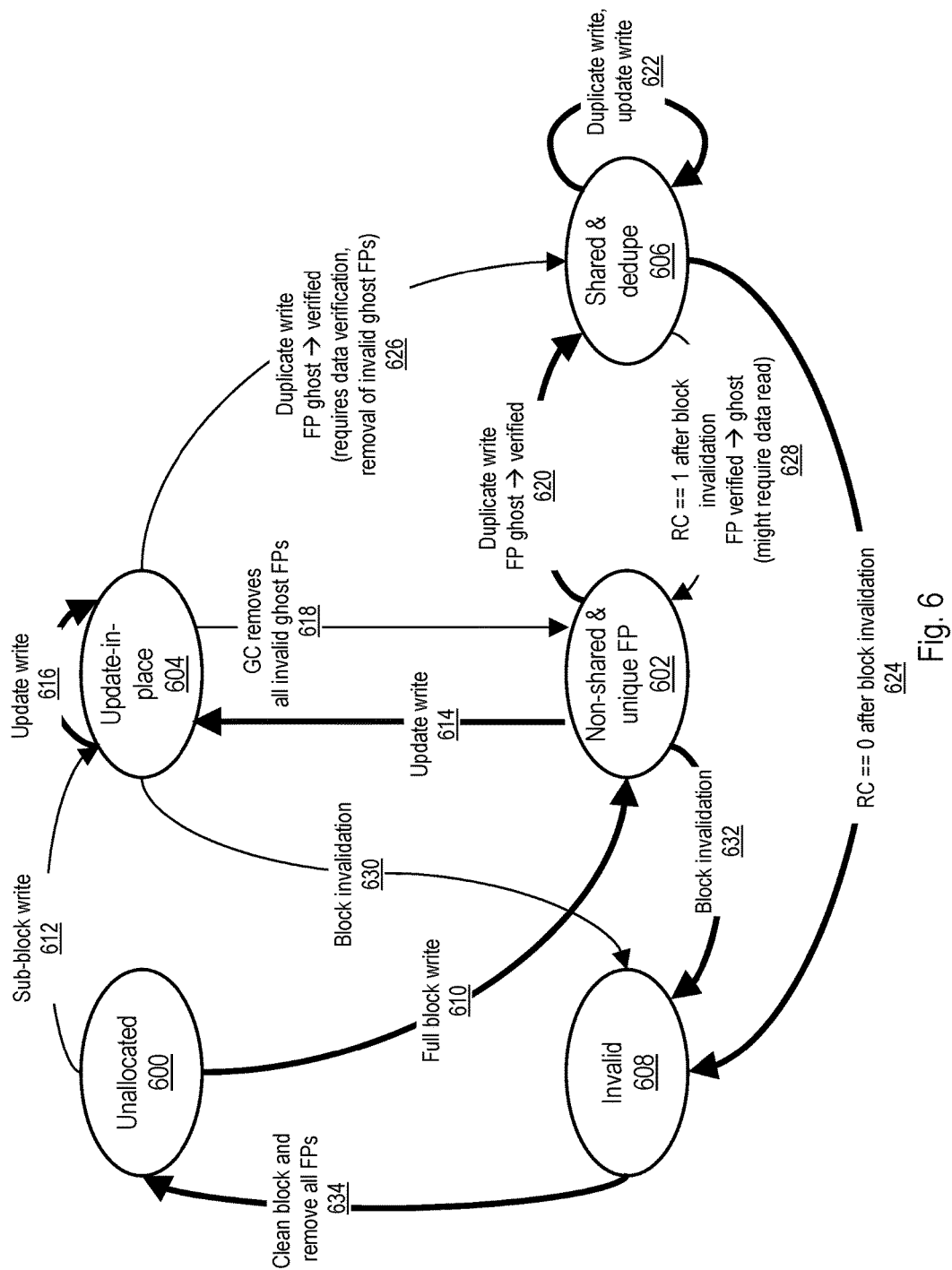
FIG. 6 is a state diagram illustrating management of an array block state (ABS) and fingerprint state (FPS) of a block of a storage array in accordance with an embodiment in which ghost fingerprints are stored only in memory.

Referring now to FIG. 6, there is depicted a state diagram illustrating management of an array block state (ABS) and fingerprint state (FPS) of a block of a storage array in accordance with an embodiment in which ghost fingerprints are cached only in memory and not stored on the underlying bulk storage media. The management process represented by this state diagram can be performed by a controller of a data storage system, which for purposes of the following description will be assumed to be controller 113 of FIG. 1B.

In FIG. 6, the ABS of an array block can have any of six states, including Unallocated state 600, Non-shared and Unique Fingerprint state 602, Update-in-place state 604, Shared and Dedupe state 606 and Invalid state 608. Each array block of a storage array begins in Unallocated state 600, which signifies that the array block address of the array block is not associated with a volume block address in address mapping data structure 158 and that the array block does not have any associated fingerprint stored in fingerprint index 154 or fingerprint index cache 119. The ABS of an array block transitions from Unallocated state 600 to either Non-shared and Unique Fingerprint state 602 or Update-in-place state 604 in response to controller 113 receiving a write IO. As shown at reference numeral 610, in the most common case in which the write IO specifies a full array block of write data (e.g., 8 kB, 16 kB, or multiple thereof), controller 113 allocates an array block for storing the write data via address mapping data structure 158, creates an address mapping entry in address mapping data structure 158, increments the relevant reference counter in the stored reference counters 156 and/or the reference counter cache 117 to a value of 1, and sets the ABS for the address translation entry to Non-shared and Unique Fingerprint state 602. As shown at reference numeral 612, in the less common case in which the write IO specifies less than a full array block of write data (e.g., 4 kB, or smaller), controller 113 performs similar processing, but sets the ABS for the address translation entry to Update-in-place state 604 instead of Non-shared and Unique Fingerprint state 602. The operation indicated by reference numeral 612 may or may not create a ghost fingerprint. In either case, when an array block is initially allocated, controller 113 sets ABS to a non-deduplication state in which deduplication is not performed and sets the FPS of the fingerprint (which is held solely in fingerprint index cache 119) to the unverified state. In the case of an array block in Non-shared and Unique Fingerprint state 602, it is known that only a single unique fingerprint, namely, a ghost fingerprint, resides in fingerprint index cache 119; assuming that a sub-block write 612 always generates a fingerprint and garbage collection step 618 only removes invalid fingerprints, an array block in Update-in-place state 604 can have zero or more associated ghost fingerprints in fingerprint index cache 119, but in case there is a ghost fingerprint, only one of these ghost fingerprints actually represents the data block (i.e., is valid) and all the others, if present, are invalid.

Controller 113 transitions the ABS of an array block from Non-shared and Unique Fingerprint state 602 to Update-in-place state 604 in response to either a partial or full update of the array block, as shown at reference numeral 614. As indicated at reference numeral 616, controller 113 similarly retains an array block in Update-in-place state 604 in response to either a partial or full update of the array block. (It is again noted that while NAND flash memory systems 150 do not physically permit in-place update of data pages 152, from the logical view of controller 113 in-place updates are permitted for array blocks in non-deduplication states.) Again, the steps in reference numeral 614 and 616 may or may not create a ghost fingerprint. Controller 113 transitions the ABS of the array block from Update-in-place state 604 to Non-shared and Unique Fingerprint state 602 as shown at reference numeral 618 in response to the garbage collection performed by space reclamation engine 115 removing all of the invalid unverified (i.e., ghost) fingerprints for the array block from fingerprint index cache 119 while keeping the ghost fingerprint representing the currently stored data in the array block. As noted above, this garbage collection can be facilitated by optionally implementing a reverse lookup capability for fingerprints in fingerprint index cache 119. In some embodiments when no valid ghost fingerprint representing the currently stored data in the array block is found, a new ghost fingerprint may be created by reading the array block, generating a fingerprint, and inserting it in the fingerprint index cache 119.

Controller 113 transitions the ABS of an array block from Non-shared and Unique fingerprint state 602 to Shared and Dedupe state 606 in response to receipt of a write IO specifying the write of a full data block for which a matching ghost fingerprint is found in fingerprint index 154 (reference numeral 620). In addition to updating the ABS, controller 113 also increments the relevant reference counter in the stored reference counters 156 and/or the reference counter cache 117 and updates the FPS of the associated fingerprint in fingerprint index cache 119 from unverified (i.e., a ghost fingerprint) to verified. Controller 113 also transitions the ABS of an array block to Shared and Dedupe state 606 from Update-in-place state 604 in response to receipt of a write IO specifying the write of a full data block for which a matching ghost fingerprint that corresponds to the actual data being stored is found in fingerprint index cache 119 (reference numeral 626). In this case, controller 113 has to verify that the matching ghost fingerprint is the valid one (and updates its FPS accordingly), for example, by reading the data of the array block from flash cards 126 and then either directly comparing the array block data to the write data or indirectly comparing them via a fingerprint match. Only when the verification is successful does controller 113 transition the ABS of the block to Shared and Dedupe state 606. If the verification is not successful, the existing array block remains in Update-in place state 604, the write will be handled as a full block write 610 (for which a new array block has to be allocated), and no deduplication is performed. Additionally, the invalid ghost fingerprint is preferably removed from the fingerprint index cache 119. Controller 113 additionally employs space reclamation engine 115 to remove all unverified fingerprints not matching the actual data stored for the array block from fingerprint index cache 119. Although these verification and removal operations are computationally expensive, they are infrequently performed and therefore do not create a significant negative impact on overall system performance. In case a reverse array block to fingerprint mapping is present data verification can be avoided for transition 626: Controller 113 can utilize this reverse mapping to identify the valid ghost fingerprint and remove all invalid ghost fingerprints. In such a scenario, upon an update write triggering transitions 614 and 616 the reverse mapping is used to immediately remove the old ghost fingerprint when the new one is added. Therefore, Update-in-place state 604 and Non-shared and Unique fingerprint 602 are essentially the same. However, this removal can be done lazily before transition 626 is performed (requiring a traversal of the fingerprint index cache 119). Thus, an array block having its ABS set to Shared and Dedupe state 606 has a reference count greater than or equal to one, a single associated verified fingerprint in fingerprint index cache 119 (and/or in the fingerprint index 154), and no associated ghost fingerprints in fingerprint index cache 119. While an array block is in Shared and Dedupe state 606, controller 113 incurs the full processing and meta-data storage overhead of deduplication for the array block, since it is presumed that an array block having at least one duplicate will likely have additional duplicates created, rather than being overwritten. Further, controller 113 performs out of place writes for any overwrites of input blocks that map to the array block.

As indicated at reference numeral 622, controller 113 retains the ABS of an array block in Shared and Dedupe state 606 in response to receipt of a write IO specifying a duplicate block or in response to an update write that retains a reference count of at least one in the associated reference counter in the stored reference counters 156 and/or the reference counter cache 117. If an update write results in a zero value of the associated reference counter, controller 113 transitions the ABS of the array block from Shared and Dedupe state 606 to Invalid state 608 (reference numeral 624). Controller 113 can optionally transition the ABS of an array block from Shared and Dedupe state 606 to Non-shared and Unique Fingerprint state 602 in response to the value of the associated reference counter 117 reaching one (reference numeral 628). In this case, no garbage collection is performed by space reclamation engine 115 to remove ghost fingerprints for the array block as there are no such ghost fingerprints for the array block, and controller 113 updates the FPS of the verified fingerprint from verified to unverified, and if needed, moves the fingerprint from fingerprint index 154 into the fingerprint index cache 119 as ghost fingerprints can only reside in the fingerprint index cache 119. Transition from Shared and Dedupe state 606 to Non-shared and Unique Fingerprint state 602 indicates that further deduplication opportunities for the array block are unlikely. Note that finding the correct fingerprint to update requires either re-reading the data and re-computing the fingerprint or maintaining a reverse mapping from verified fingerprints to array blocks and is therefore costly in term of memory consumption and/or processing overhead.

As illustrated at reference numerals 630 and 632, controller 113 transitions the ABS of an array block from either Update-in-place state 604 or Unique fingerprint state 602 to Invalid state 608 in response to receipt of a block invalidation (either an overwrite IO specifying duplicate data, a trim command, or volume deletion command that removes the array block from use). In this transition, controller 113 decrements the value of the associated reference counter 117 to zero. When an array block is in Invalid state 608, the block data and all associated fingerprint metadata are removed from use and are simply awaiting removal from address mapping data structure 158 and fingerprint index 154 by space reclamation engine 115. Once such garbage collection is performed, controller 113 resets the associated reference counter to a predefined unused value (e.g., to −1) and transitions the array block from Invalid state 608 to Unallocated state 600 (reference numeral 634).

The first class of implementations represented by FIGS. 5-6 seek to avoid verification of fingerprints, which is computationally and/or resource expensive and may thus reduce the sustained system performance. This first class of implementations transitions as many array blocks as possible to either the Update-in-place state 504, 604 (which is designed to handle random writes of unique data) or Shared and Dedupe state 506, 606 (which is designed to handle highly duplicative workloads, such as Virtual Desktop Initiative (VDI) workloads), while seeking to avoid the computational expense and NAND flash accesses to fingerprint metadata pages 400 in the fingerprint index 154 and data pages 152 in response to transitions from Update-in-place state 504, 604 to Shared and Dedupe state 506, 606. The first class of implementations thus provides full or near-full inline deduplication. In cases in which the capacity for ghost fingerprints in fingerprint index cache 119 is exhausted, generation of a new fingerprint can be handled in Non-shared and Unique Fingerprint state 502, 602 by controller 113 transitioning the ABS of the array block to Shared and Dedupe state 506 and adding the new fingerprint as a verified fingerprint (which is stored in the fingerprint index 154 on the NAND flash media). If a new fingerprint is generated while the capacity for ghost fingerprints in fingerprint index cache 119 is exhausted and the ABS of an array block is in Update-in-place state 504, 604 controller 113 considers the access to be a random write update and reverts to best efforts deduplication by discarding the new fingerprint or any other ghost fingerprint. Note that in case controller 113 discards only invalid ghost fingerprints deduplication still remains exhaustive. (Controller 113 can seek to reduce the incidence of reversion to best efforts deduplication by having space reclamation engine 115 periodically clean up invalid ghost fingerprints in the background and by transitioning array blocks from Non-shared and Unique Fingerprint state 502, 602 to Shared and Dedupe state 506, 606 in the background.)

Figure 7A:
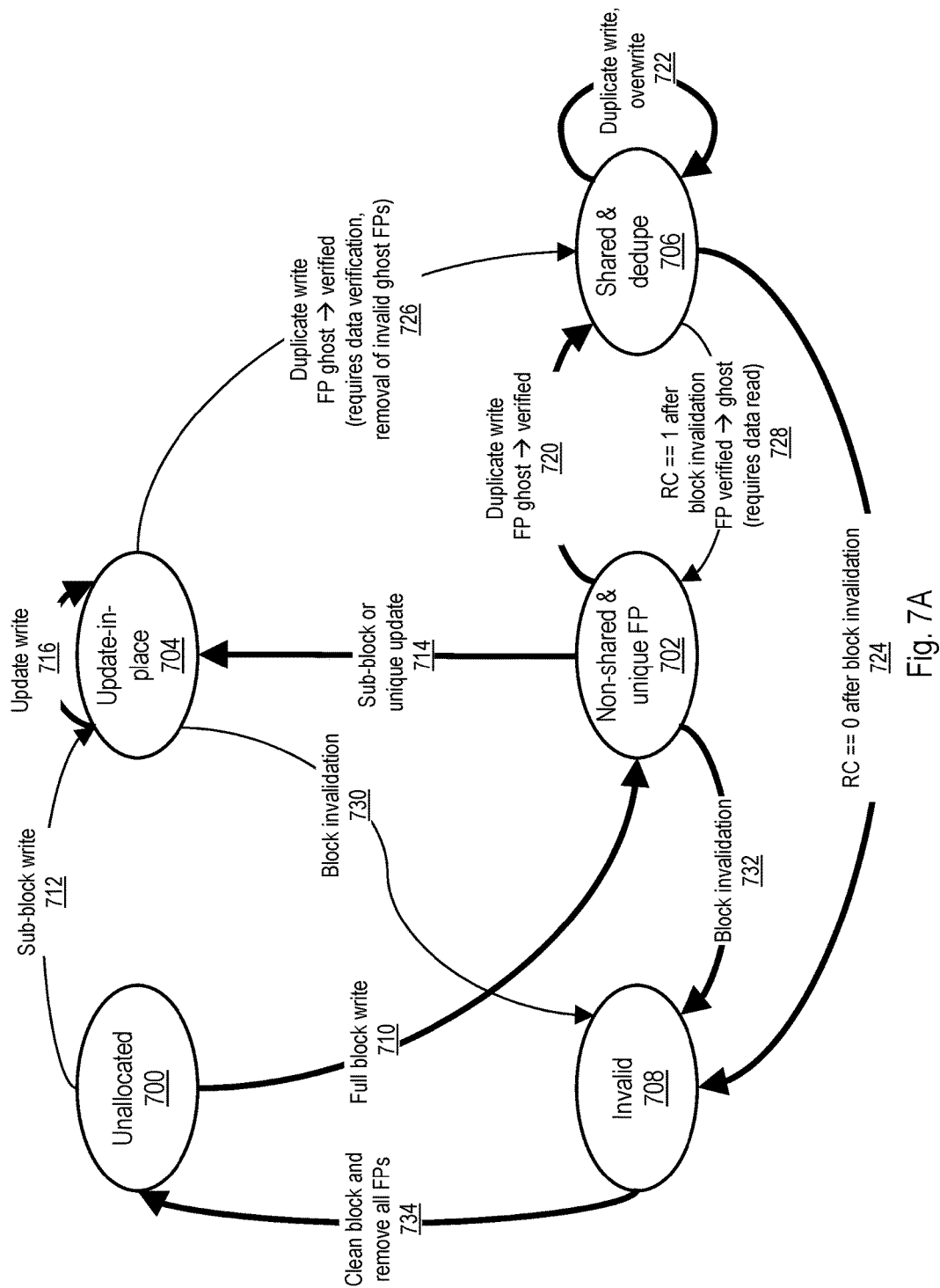
FIG. 7A is a state diagram illustrating management of an array block state (ABS) and fingerprint state (FPS) of a block of a storage array in accordance with an embodiment in which ghost fingerprints are maintained in both memory and the bulk storage media.

Referring now to FIG. 7A, there is depicted a state diagram illustrating management of an array block state (ABS) and fingerprint state (FPS) of a block of a storage array in accordance with an embodiment in which ghost fingerprints are maintained in both memory and the bulk storage media. The management process represented by this state diagram can be performed by a controller of a data storage system, which for purposes of the following description will be assumed to be controller 113 of FIG. 1B. In the second class of implementations represented by FIG. 7A as well as FIGS. 7B and 8, which all maintain ghost fingerprints in fingerprint index cache 119 in memory 118 and in fingerprint index 154 on the NAND flash storage media, a greater number of ghost fingerprints can advantageously be maintained through use of the greater storage capacity of the NAND flash media. However, transitions of the ABS of an array block from the Update-in-place state to the Non-shared and Unique Fingerprint state or the Shared and Dedupe state to the Non-shared and Unique Fingerprint state are more costly and preferably avoided because these transitions entail access to and removal of ghost fingerprints from the NAND flash storage media.

In FIG. 7A, the ABS of an array block can have any of five states, including Unallocated state 700, Non-shared and Unique Fingerprint state 702, Update-in-place state 704, Shared and Dedupe state 706, and Invalid state 708. Each array block of a storage array begins in Unallocated state 700, which signifies that the array block address of the array block is not associated with a volume block address in address mapping data structure 158 and that the array block does not have any associated fingerprint stored in fingerprint index 154 or fingerprint index cache 119. Controller 113 transitions the ABS of an array block from Unallocated state 700 to either Non-shared and Unique Fingerprint state 702 or Update-in-place state 704 in response to controller 113 receiving a write IO. As shown at reference numeral 710, in the most common case in which the write 10 specifies a full array block of write data (e.g., 4 kB, 8 kB, 16 kB, or a multiple thereof), controller 113 allocates an array block for storing the write data via address mapping data structure 158, creates an address mapping entry in address mapping data structure 158, increments the relevant reference counter in the stored reference counters 156 and/or the reference counter cache 117 to a value of 1, and sets the ABS for the address translation entry to Non-shared and Unique Fingerprint state 702. As shown at reference numeral 712, in the less common case in which the write 10 specifies less than a full array block of write data (e.g., smaller than 4 kB), controller 113 performs similar processing, but sets the ABS for the address translation entry to Update-in-place state 704 instead of Non-shared and Unique Fingerprint state 702. In either case, when an array block is initially allocated, controller 113 sets ABS to a non-deduplication state in which no deduplication is performed for the array block and sets the FPS of the fingerprint to the unverified state. In the case of an array block in Non-shared and Unique Fingerprint state 702, it is known that only a single unique fingerprint for the array block, namely, a ghost fingerprint, resides in fingerprint index 154 or fingerprint index array 119; assuming that writing a sub-block 712 always generates a fingerprint, an array block in Update-in-place state 704 can have one or more associated ghost fingerprints in fingerprint index 154 or fingerprint index cache 119, but only one of these ghost fingerprints actually represents the data of the array block (i.e., is valid) and all the others, if present, are invalid. In other embodiments, writing a sub-block in steps 712 and 716 may not generate a fingerprint, hence an array block in Update-in-place state 704 can have zero or more associated ghost fingerprints. Clearly, in this case at most one of these fingerprints actually represents the data of the array block (i.e., is valid), and all others, if present, are invalid.

Controller 113 transitions the ABS of an array block from Non-shared and Unique Fingerprint state 702 to Update-in-place state 704 in response to either a partial or full update of the array block, as shown at reference numeral 714. As indicated at reference numeral 716, controller 113 similarly retains an array block in Update-in-place state 704 in response to either a partial or full update of the array block. Unlike the embodiments of FIG. 6, in the embodiment of FIG. 7A, controller 113 does not support a transition of the ABS of the array block from Update-in-place state 704 to Non-shared and Unique Fingerprint state 702 in order to avoid garbage collection accesses to the NAND storage media.

Controller 113 transitions the ABS of an array block from Non-shared and Unique Fingerprint state 702 to Shared and Dedupe state 706 (in which deduplication is performed for the array block) in response to receipt of a write IO specifying the write of a full data block for which a matching ghost fingerprint is found in fingerprint index 154 (reference numeral 720). In addition to updating the ABS, controller 113 also increments the relevant reference counter in the stored reference counters 156 or reference counter cache 117 and updates the FPS of the single associated fingerprint in fingerprint index 154 and/or fingerprint index cache 119 from unverified (i.e., a ghost fingerprint) to verified. Controller 113 also transitions the ABS of an array block to Shared and Dedupe state 706 from Update-in-place state 704 in response to receipt of a write IO specifying the write of a full data block for which a matching ghost fingerprint that corresponds to the actual data being stored is found in fingerprint index 154 (or fingerprint index cache 119) (reference numeral 726). In this case, controller 113 has to verify that the matching ghost fingerprint is the valid one (and updates its FPS accordingly), for example, by reading the data of the array block from flash cards 126 and then either directly comparing the array block data to the write data or indirectly comparing them via a fingerprint match. Only when the verification is successful, controller 113 transitions to Shared and Dedupe state 706. If the verification is not successful, the existing array block remains in Update-in-place state 704, the write will be handled as a full block write 710 (for which a new array block has to be allocated), and no deduplication is performed. Controller 113 also employs space reclamation engine 115 to remove unverified fingerprints for the array block from fingerprint index 154 in response to state transition 726. Thus, an array block having its ABS set to Shared and Dedupe state 706 has a reference count greater than or equal to one, has a single associated verified fingerprint in fingerprint index 154, and will have no associated ghost fingerprints in fingerprint index 154 or fingerprint index cache 119. While an array block is in Shared and Dedupe state 706, controller 113 incurs the full processing and meta-data storage overhead of deduplication for the array block, since it is presumed that the array block having at least one duplicate and will likely have additional duplicates created, rather than being overwritten. Further, controller 113 performs out of place writes for any overwrites of input blocks that map to the array block.

As indicated at reference numeral 722, controller 113 retains the ABS of an array block in Shared and Dedupe state 706 in response to receipt of an write IO specifying a duplicate block write or in response to an update write that retains a reference count of at least one in the associated reference counter 117. If an update write results in a zero value of the associated reference counter in the stored reference counters 156 and/or the reference counter cache 117, controller 113 transitions the ABS of the array block from Shared and Dedupe state 706 to Invalid state 708 (reference numeral 724). Controller 113 may transition the ABS of an array block from Shared and Dedupe state 706 to Non-shared and Unique Fingerprint state 702 in response to the value of the associated reference counter 117 being decremented to one and the array block having only one associated fingerprint (i.e., a verified fingerprint) in fingerprint index 154 or fingerprint index cache 119 (reference numeral 728). In this case, controller 113 updates the FPS of the remaining fingerprint from verified to unverified, which entails an access to the NAND flash media. Transition from Shared and Dedupe state 706 to Non-shared and Unique Fingerprint state 702 indicates that further deduplication opportunities for the array block are unlikely.

As illustrated at reference numerals 730 and 732, controller 113 transitions the ABS of an array block from either Update-in-place state 704 or Non-shared and Unique fingerprint state 702 to Invalid state 708 in response to receipt of an write IO specifying a deduplication write, a trim command, or volume deletion command that removes the array block from use. In this transition, controller 113 decrements the value of the associated reference counter 117 to zero. When an array block is in Invalid state 708, the block data and all associated fingerprint metadata are removed from use and are simply awaiting removal from address mapping data structure 158 and fingerprint index 154 by space reclamation engine 115. Once such garbage collection is performed, controller 113 sets the associated reference counter to a predefined unused value (e.g., to −1) and transitions the array block from Invalid state 708 to Unallocated state 700 (reference numeral 734).

With reference now to FIG. 7B, there is given a state diagram illustrating management of an array block state (ABS) and fingerprint state (FPS) of a block of a storage array in accordance with an embodiment in which ghost fingerprints are lazily maintained in both memory and the bulk storage media. As indicated by like reference numerals, the embodiment of FIG. 7B is similar to that illustrated in FIG. 7A, except that the state diagram includes no state transition from Shared and Dedupe state 706 to Non-shared and Unique Fingerprint state 702 and no state transition from Update-in-place state 704 to Shared and Dedupe state 706 given the computational expense and wear associated with performing garbage collection for ghost fingerprints on the NAND flash storage media. As a result, Shared and Dedupe state 706 does indicate that no ghost fingerprints exist for the array block. Furthermore, in Update-in-place state 704 no new fingerprints are generated so a block in this state has at most one associated invalid ghost fingerprint.

Figure 8:
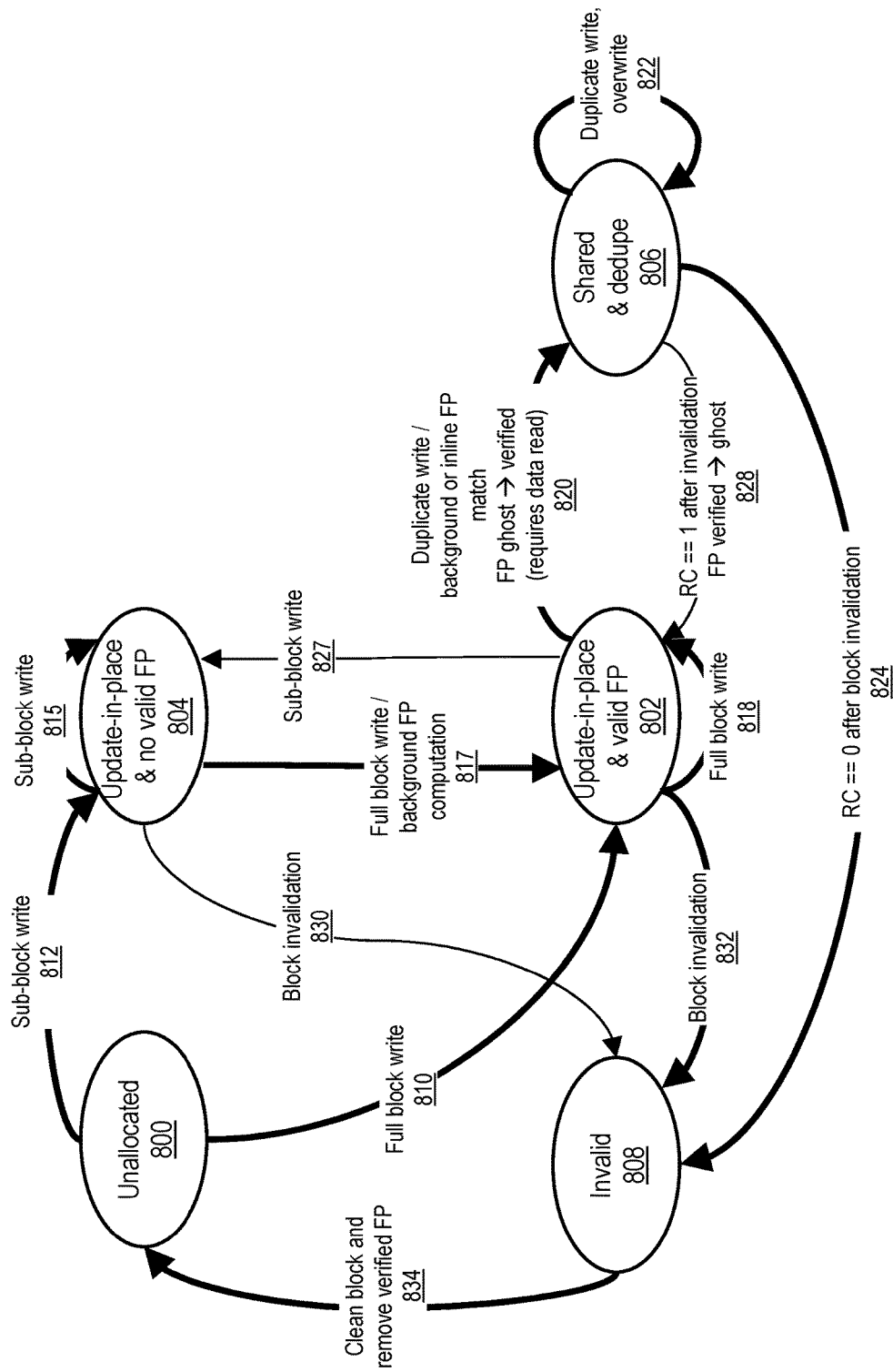
FIG. 8 is a state diagram illustrating management of an array block state (ABS) and fingerprint state (FPS) of a block of a storage array in accordance with yet another embodiment in which ghost fingerprints are maintained in both memory and the bulk storage media.

Referring now to FIG. 8, there is depicted a state diagram illustrating management of an array block state (ABS) and fingerprint state (FPS) of a block of a storage array in accordance with yet another embodiment in which ghost fingerprints are maintained in both memory and the bulk storage media. This design is characterized by lower complexity, but slightly higher computational cost for the first duplicate write that is detected, and the ability to perform deduplication even for data written using writes smaller than the dedupe block size. The management process represented by this state diagram can be performed by a controller of a data storage system, which for purposes of the following description will be assumed to be controller 113 of FIG. 1B.

In FIG. 8, the ABS of an array block can have any of five states, including Unallocated state 800, Update-in-place with Valid Fingerprints state 802, Update-in-place without Valid Fingerprints state 804, Shared and Dedupe state 806, and Invalid state 808. Each array block of a storage array begins in Unallocated state 800, which signifies that the array block address of the array block is not associated with a volume block address in address mapping data structure 158 or address mapping cache 121 and that the array block does not have any associated fingerprint stored in fingerprint index 154 or fingerprint index cache 118. Controller 113 transitions the ABS of an array block from Unallocated state 800 to either Update-in-place with Valid Fingerprints state 802 or Update-in-place without Valid Fingerprints state 804 (in both states no deduplication is performed for the array block) in response to controller 113 receiving a write IO. As shown at reference numeral 810, in the most common case in which the write IO specifies a full array block of write data (e.g., 4 kB, 8 kB, 16 kB, or a multiple thereof), controller 113 allocates an array block for storing the write data via address mapping data structure 158, creates an address mapping entry in address mapping data structure 158, increments the relevant reference counter in the stored reference counters 156 and/or the reference counter cache 117 to a value of 1, sets the ABS for the address translation entry to Update-in-place with Valid Fingerprints state 802, and computes a fingerprint that is stored in either the fingerprint index 154 and/or the fingerprint cache 118. In the case of an array block in Update-in-place with Valid Fingerprints state 802, it is known that one or possibly more ghost fingerprints reside in fingerprint index 154 or fingerprint index cache 118. As shown at reference numeral 812, in the less common case in which the write IO specifies less than a full array block of write data (e.g., 4 kB or smaller), controller 113 allocates an array block for storing the write data via address mapping data structure 158, creates an address mapping entry in address mapping data structure 158, increments the relevant reference counter in the stored reference counters 156 and/or the reference counter cache 117 to a value of 1, and sets the ABS for the address translation entry to Update-in-place without Valid Fingerprints state 804. For an array block in update-in-place without Valid fingerprints state 804, no ghost fingerprints are computed or stored in fingerprint index 154 or fingerprint index cache 118 when transitions 812 is performed.

Controller 113 retains the ABS of an array block in Update-in-place with Valid Fingerprints state 802 in response to a full update of the array block, as shown at reference numeral 818. As indicated at reference numeral 815, controller 113 similarly retains an array block in Update-in-place without Valid fingerprints state 804 in response to a partial update of the array block. In response to a full update of an array block in Update-in-place without Valid Fingerprints state 804, controller 113 transitions the ABS of the array block to Update-in-place with Valid Fingerprints state 802, as shown at reference numeral 817. It should be noted that this state transition can also be triggered by a background deduplication process (if desired), which will read the entire array block to generate the fingerprint that will be inserted into fingerprint index 154 or fingerprint index cache 118.

Controller 113 transitions the ABS of an array block from Update-in-place with Valid Fingerprint state 802 to Update-in-place without Valid Fingerprint state 804 in response to a partial (sub-block) update of the array block (reference numeral 827). In this case, similarly to transition 812, no fingerprint is computed or stored in the fingerprint index 154 or in the fingerprint index cache 118.

Controller 113 transitions the ABS of an array block from Update-in-place with Valid Fingerprints state 802 to Shared and Dedupe state 806 (in which deduplication is also performed) in response to receipt of a write IO specifying the write of a full data block for which a matching ghost fingerprint is found in fingerprint index 154 or fingerprint index cache 118 (reference numeral 820). In this case, controller 113 must also verify if the matching ghost fingerprint is the valid one (and update its FPS accordingly). This fingerprint verification entails reading the array block data from the NAND storage media and either directly comparing the data or its fingerprint to determine a match. Only when this verification is successful can controller 113 transition the ABS of the block to Shared and Dedupe state 806. If the verification is not successful, the existing array block remains in Update-in place with Valid Fingerprints state 802, the write will be handled as a full block write 810 (for which a new array block has to be allocated), and no deduplication is performed. Additionally, the invalid ghost fingerprint is preferably removed from the fingerprint index cache 118 and/or the fingerprint index 154. In addition to updating the ABS, controller 113 also increments the relevant reference counter in the stored reference counters 156 and/or the reference counter cache 117 and updates the FPS of the matching ghost fingerprint in fingerprint index 154 or fingerprint index cache 118 from unverified (i.e., a ghost fingerprint) to verified. Note that at this point invalid ghost fingerprints pointing to this array block may still exist as transition 820 does not involve garbage collection of ghost fingerprints. An array block having its ABS set to Shared and Dedupe state 806 has a reference count greater than or equal to one, has a single associated verified fingerprint in fingerprint index 154, and may have associated ghost fingerprints in fingerprint index 154 or fingerprint index cache 118. While an array block is in Shared and Dedupe state 806, controller 113 incurs the full processing and meta-data storage overhead of deduplication for the array block, since it is presumed that an array block having at least one duplicate will likely have additional duplicates created, rather than being overwritten. Further, controller 113 performs out of place writes for any overwrites of input blocks that map to the array block. It should be noted that in this embodiment, controller 113 does not support any transitions of the ABS of an array block from Update-in-place without Valid Fingerprints state 804 to Shared and Dedupe state 806 because the array block does not have an associated valid ghost fingerprint.

As indicated at reference numeral 822, controller 113 retains the ABS of an array block in Shared and Dedupe state 806 in response to receipt of an write IO specifying a duplicate block write. If one of these operations results in a zero value of the associated reference counter in the stored reference counters 156 and/or the reference counter cache 117, controller 113 transitions the ABS of the array block from Shared and Dedupe state 806 to Invalid state 808 (reference numeral 824). Controller 113 transitions the ABS of an array block from Shared and Dedupe state 806 to Update-in-place with Valid fingerprints state 802 in response to an update write the array block while the value of the associated reference counter 117 is one (reference numeral 828). In this case, controller 113 removes the verified fingerprint from fingerprint index 154 or fingerprint index cache 118 and adds the newly computed ghost fingerprint to fingerprint index 154 and/or fingerprint index cache 118, which may entail an access to the NAND flash media.

As illustrated at reference numerals 830 and 832, controller 113 transitions the ABS of an array block from either Update-in-place without Valid Fingerprint state 804 or Update-in-place with Valid Fingerprint state 802 to Invalid state 808 in response to receipt of an array block invalidation, such as a write IO specifying a deduplication write, a trim command, or volume deletion command that removes the array block from use. In this transition, controller 113 decrements the value of the associated reference counter in the stored reference counters 156 and/or the reference counter cache 117 to zero. When an array block is in Invalid state 808, the block data and all associated fingerprint metadata are removed from use and are simply awaiting removal from address mapping data structure 158 and fingerprint index 154 by space reclamation engine 115. Once such garbage collection is performed, controller 113 sets the associated reference counter to a predefined unused value (e.g., to −1) and transitions the array block from Invalid state 808 to Unallocated state 800 (reference numeral 834).

Figure 9:
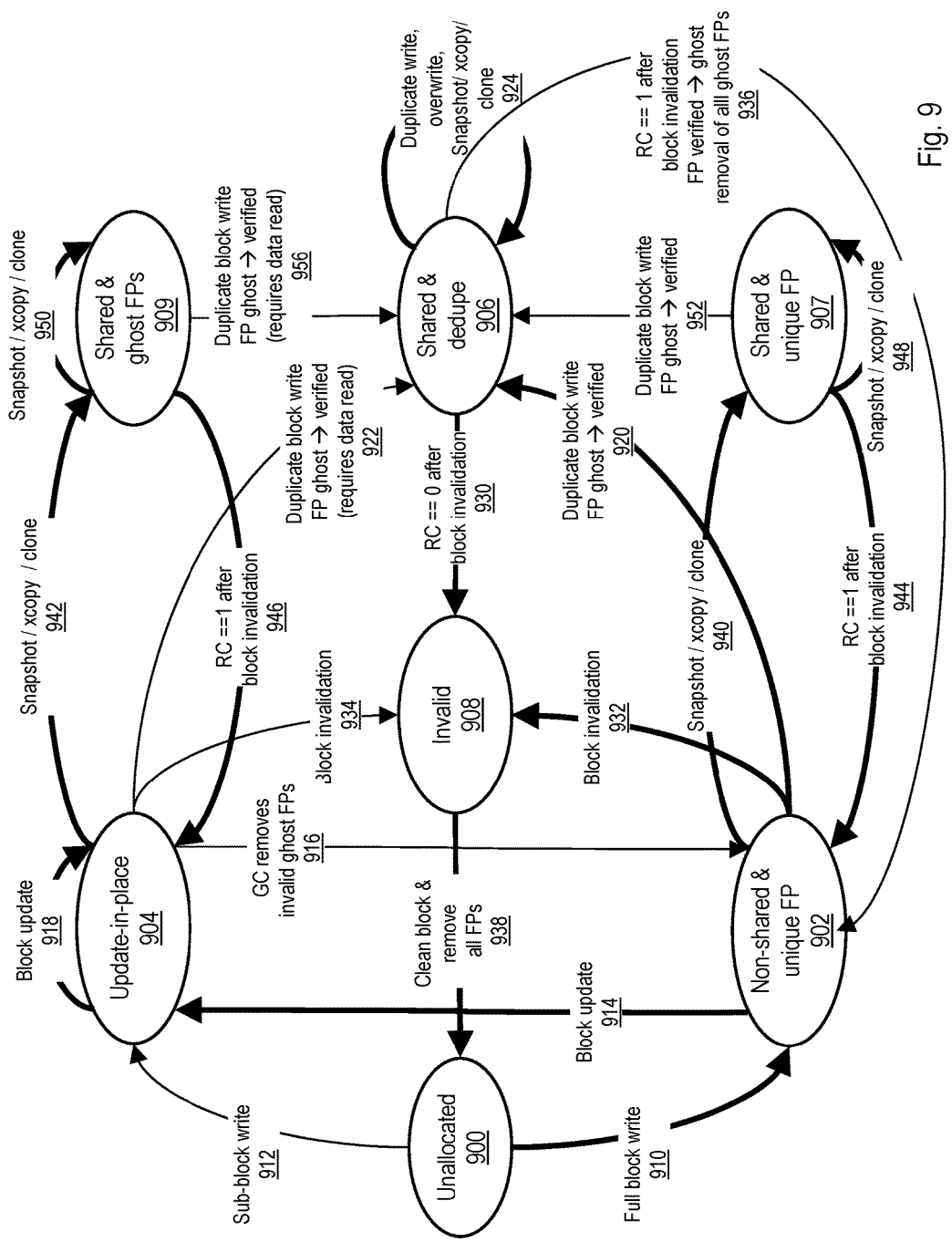
FIG. 9 is a state diagram illustrating management of an array block state (ABS) and fingerprint state (FPS) of a block of a storage array in accordance with yet another embodiment that distinguishes between sharing of array blocks caused by deduplication and sharing of array blocks attributed to other features supported by the storage system such as volume snapshots, storage-side copy commands (e.g., XCOPY), or volume clone operations.

With reference now to FIG. 9, a state diagram is illustrated depicting the management of the array block state (ABS) and fingerprint state (FPS) of a block of a storage array in accordance with yet another embodiment that distinguishes between sharing of array blocks triggered by deduplication and sharing of array blocks attributed to other features supported by the storage system such as volume snapshots, storage-side copy commands (e.g., XCOPY), or volume clone operations. FIG. 9 therefore shows how deduplication based on ghost fingerprints (including the maintenance of address translation, FPS, ABS, and reference counters metadata) can be integrated with other storage features that generate additional sources of array block sharing. The management process represented by this state diagram can be performed by a controller of a data storage system, which for the purposes of the following description will be assumed to be controller 113 of FIG. 1B. More common state transitions in this and the other state diagrams given herein are indicated by heavyweight lines, and less common state transitions are indicated by lightweight lines.

In the embodiment of FIG. 9, the ABS of an array block can be in any of seven states, including Unallocated state 900, Non-shared and Unique Fingerprint state 902, Update-in-place state 904, Shared and Dedupe state 906, Shared and Ghost Fingerprint state 909, Shared and Unique Fingerprint state 907, and Invalid state 908. Each array block of a storage array begins in Unallocated state 900, which signifies that the array block address of the array block is not associated with a volume block address in address mapping data structure 158 and that the array block does not have any associated fingerprint stored in fingerprint index 154 or fingerprint index cache 119. An unallocated array block may hence be implemented in a way that no storage physical storage spaces is used in flash cards 126.

The ABS of an array block transitions from Unallocated state 900 to either Non-shared and Unique Fingerprint state 902 or Update-in-place state 904 in response to controller 113 receiving a write IO. As shown at reference numeral 910, in the most common case in which the write IO specifies a full array block of write data (e.g., 4 kB, 8 kB, 16 kB, or a multiple thereof), controller 113 allocates one or more array blocks for storing the write data via address mapping data structure 158, creates one or more address mapping entries in address mapping data structure 158 for each of the array blocks, increments the relevant reference counter in the stored reference counters 156 and/or the reference counter cache 117 to a value of 1, and sets the ABS for the address translation entry to Non-shared and Unique Fingerprint state 902. As shown at reference numeral 912, in the less common case in which the write IO specifies less than a full array block of write data (e.g., smaller than 4 kB), controller 113 performs similar processing, but sets the ABS for the address translation entry to Update-in-place state 902 instead of Non-shared and Unique Fingerprint state 902. In this case, the actual write operation may be performed in a read-modify-write sequence in some embodiments. In either case, when an array block is initially allocated, controller 113 sets ABS to a non-deduplication state in which data deduplication is not performed and sets the FPS of the array block to the unverified state. Note that in some embodiments, a sub-block write 912 may result in no fingerprint being created, and therefore no FPS has to be set. In the case of an array block in Non-shared and Unique Fingerprint state 902, it is known that only a single unique fingerprint, namely, a ghost fingerprint, resides in fingerprint index 154 or fingerprint index cache 119; an array block in Update-in-place state 904 can have one or more associated ghost fingerprints in the fingerprint index 154 or fingerprint index cache 119, but only one of these actually represents the data of array block (i.e., is valid) and all the others, if present, are invalid. Clearly, in embodiments that do not create a fingerprint upon a sub-block write 912 there may even be no fingerprint for a block whose ABS is in the Update-in-place state 904 state.

Note that for a duplicate write to unallocated space a fresh array block may be allocated or not. In case the detection of the duplicate is performed entirely inline (i.e., before the write is acknowledged to the processor system 102), the allocation of an array block is not needed. When the write IO is acknowledged before the deduplication engine 125 detects a duplicate, data may have to be made persistent before the actual deduplication and therefore require an array block to be allocated. The same is true for updates with duplicate data to allocated space that map to existing array blocks in the Shared and Dedupe state 906.

Controller 113 transitions the ABS of an array block from Non-shared and Unique Fingerprint state 902 to Update-in-place state 904 in response to either a partial or full update of the array block, as shown at reference numeral 914. As indicated at reference numeral 916, controller 113 similarly retains an array block in Update-in-place state 904 in response to either a partial or full update of the array block, as shown by transition 918. It will be appreciated that while NAND flash memory systems 150 do not physically permit in-place update of data pages 152, from the logical view of controller 113 in-place updates are permitted for array blocks. Therefore, in-place updates can be done in non-deduplication states 902 and 904. Controller 113 transitions the ABS of the array block from Update-in-place state 904 to Non-shared and Unique Fingerprint state 902 as shown at reference numeral 916 in response to the garbage collection performed by space reclamation engine 115 optionally removing either all of the unverified (i.e., ghost) fingerprints or all invalid ghost fingerprints (i.e., retaining only the single ghost fingerprint that corresponds to the data being stored in the array block if such a ghost fingerprint exists) for the array block from fingerprint index 154 or fingerprint index cache 119. The ABS may for this purpose maintain a counter representing the number of overwrites seen and the counter may further be stored in the FPS in order to facilitate the detection of the last fingerprint created for the array block.

Controller 113 transitions the ABS of an array block to Shared and Dedupe state 906 (in which inline deduplication is performed for the array block) from either Non-shared and Unique Fingerprint state 902 (transition 920) or from Shared and Unique Fingerprint state 909 (transition 952) in response to receipt of a write IO specifying the write of a full data block for which a matching ghost fingerprint is found in fingerprint index 154. Note that the transition does not require a verification of the fingerprint because the matching fingerprint is the only fingerprint for this array block. Therefore, the deduplication overhead is minimized for the transition shown at reference numeral 920. In addition to updating the ABS, controller 113 also increments the reference counter in the stored reference counters 156 and/or the reference counter cache 117 for the array block and updates the FPS of the associated fingerprint in fingerprint index 154 from unverified (i.e., a ghost fingerprint) to verified. Depending on the implementation of the FPS, controller 113 may further adapt the array block address in the FPS from an input block address to an output block address or vice versa.

Controller 113 also transitions the ABS of an array block to Shared and Dedupe state 906 either from Update-in-place state 904 (transition 922) or from Shared and Ghost Fingerprints state 909 (transition 956) in response to receipt of a write IO specifying the write of a full data block for which a matching ghost fingerprint is found in fingerprint index 154 (reference numeral 926). In this case, controller 113 must also verify if the matching ghost fingerprint is the valid one (and update its FPS accordingly), for example, by reading the data of the array block from flash cards 126 and then either directly comparing the array block data to the write data or indirectly comparing them via a fingerprint match. Only when this verification is successful does controller 113 transition to Shared and Dedupe state 906. If the verification is not successful, the existing array block remains in Update-in place state 904 or in Shared and Ghost Fingerprints state 909, the write is handled as a full block write 910 (for which a new array block has to be allocated), and no deduplication is performed. Additionally, the invalid ghost fingerprint is preferably removed from the fingerprint index cache 119 and/or the fingerprint index 154. Although this verification operation is computationally expensive, it is infrequently performed and therefore does not create a significant negative impact on the overall system performance. Thus, an array block having its ABS set to Shared and Dedupe state 906 has a reference count greater than or equal to one, a single associated verified fingerprint in fingerprint index 154, and possibly one or more associated ghost fingerprints in fingerprint index 154 and/or fingerprint index cache 119. While an array block is in Shared and Dedupe state 906, controller 113 incurs the full processing and meta-data storage overhead of deduplication for the array block, since it is presumed that an array block having at least one duplicate will likely have additional duplicates, rather than being overwritten. Further, controller 113 performs out of place writes for any overwrites of input blocks that map to the array block.

As indicated at reference numeral 924, controller 113 retains the ABS of an array block in Shared and Dedupe state 906 in response to receipt of a write IO specifying a duplicate block write or in response to an overwrite, such as a trim command, or a volume deletion that, upon update of the reference counter in the stored reference counters 156 and/or the reference counter cache 117, results in a reference count in the associated reference counter in the stored reference counters 156 and/or the reference counter cache 117 of at least one. If the overwrite, trim or volume deletion results in a zero value of the reference counter, controller 113 transitions the ABS of the array block from Shared and Dedupe state 906 to Invalid state 908 (reference numeral 930). Controller 113 transitions the ABS of an array block from Shared and Dedupe state 906 to Non-shared and Unique Fingerprint state 902 in response to the value of the associated reference counter in the stored reference counters 156 and/or the reference counter cache 117 reaching one and the garbage collection performed by space reclamation engine 115 deciding to remove all of the ghost fingerprints for the array block from fingerprint index 154 (reference numeral 936). In this case, controller 113 additionally updates the FPS of the remaining fingerprint from verified to unverified. Transition 936, from Shared and Dedupe state 906 to Non-shared and Unique Fingerprint state 902, indicates that further deduplication opportunities for the array block are unlikely.

As illustrated at reference numerals 940, controller 113 transitions the ABS of an array block from Non-shared and Unique Fingerprint state 902 to Shared and Unique Fingerprint state 907 and sets the reference counter to a value of two in response to an IO request that results in the block being referenced (shared) by multiple addresses. Such block sharing can result either from a volume snapshot command, a storage-side copy command (e.g., XCOPY), or a volume clone operation. Shared and Unique Fingerprint state 907 state reflects that the array block is being shared due to multiple addresses being mapped to it explicitly as a result of an user command, rather than implicitly due to the addresses storing the same content. In Shared and Unique Fingerprint state 907, any write IO to an address mapped to the array block must be performed out of place by allocating and writing to a new array block. A block in Shared and Unique Fingerprint state 907 has zero or more ghost fingerprints as the FPS is not updated following transitions 940. As indicated at reference numeral 950, controller 113 retains the ABS of an array block in Shared and Unique Fingerprint state 907 in response to receipt of a write IO triggering a block invalidation (such as an overwrite, a trim command, or a volume deletion) or in response to an IO command that creates additional explicit sharing (such as snapshot, XCOPY, or clone) that, upon update of the reference counter in the stored reference counters 156 and/or the reference counter cache 117, results in a reference count in the associated reference counter in the stored reference counters 156 and/or the reference counter cache 117 of at least two. If a block invalidation results in a reference counter value of one, controller 113 transitions the ABS of the array block from Shared and Unique Fingerprint state 907 back to Non-shared and Unique Fingerprint state 902 (reference numeral 944).

As illustrated at reference numerals 942, controller 113 transitions the ABS of an array block from Update-in-place state 904 to Shared and Ghost Fingerprints state 909 and sets the reference counter to a value of two in response to an IO request that results in the block being referenced (shared) by multiple addresses. Such block sharing can result either from a volume snapshot command, a storage-side copy command (e.g., XCOPY), or a volume clone operation. Shared and Ghost Fingerprint state 909 reflects that the array block is being shared due to multiple addresses being mapped to it explicitly as a result of an user command, rather than implicitly due to the addresses storing the same content. In Shared and Ghost Fingerprint state 909, any write IO to an address mapped to the array block must be performed out of place by allocating and writing to a new array block. A block in Shared and Ghost Fingerprint state 909 has zero or more ghost fingerprints as the FPS is not updated following transition 942. As indicated at reference numeral 950, controller 113 retains the ABS of an array block in Shared and Ghost Fingerprint state 909 in response to receipt of a write IO triggering a block invalidation (such as an overwrite, a trim command, or a volume deletion) or in response to an IO command that creates additional explicit sharing (such as snapshot, XCOPY, or clone) that, upon update of the reference counter in the stored reference counters 156 and/or the reference counter cache 117, results in a reference count in the associated reference counter in the stored reference counters 156 and/or the reference counter cache 117 of at least two. If a block invalidation results in a reference counter value of one, controller 113 transitions the ABS of the array block from Shared and Ghost Fingerprint state 909 back to Update-in-place state 904 (reference numeral 946).

As illustrated at reference numerals 932 and 934, controller 113 transitions the ABS of an array block from either Update-in-place state 904 or Non-shared and Unique Fingerprint state 902 to Invalid state 908 in response to a block invalidation, such as an overwrite, a trim command, volume deletion, snapshot deletion that removes the array block from use. When an array block is in Invalid state 908, the block data and all associated fingerprint metadata are removed from use and are simply awaiting removal from address mapping data structure 158 (and address mapping cache 121) and fingerprint index 154 (and fingerprint index cache 119) by space reclamation engine 115. Once such garbage collection is performed, controller 113 sets the associated reference counter to a predefined unused value (e.g., to −1) and transitions the array block from Invalid state 908 to Unallocated state 900 (reference numeral 938).

Differing implementations of the general state diagram given in FIG. 9 can additionally be explored based upon specific architectural choices, such as the manner in which fingerprints are handled. Moreover, not all transitions presented in FIG. 9 need be to be implemented. Only a subset of the state transitions are required such that the state diagram graph is connected (i.e., there is a path from any state to any other state either directly or indirectly through other states).

As has been described, in at least one embodiment, a controller of a data storage system generates fingerprints of data blocks written to the data storage system. The controller maintains, in a data structure, respective state information for each of a plurality of data blocks. The state information for each data block can be independently set to indicate any of a plurality of states, including at least one deduplication state and at least one non-deduplication state. At allocation of a data block, the controller initializes the state information for the data block to a non-deduplication state and, thereafter, in response to detection of a write of duplicate of the data block to the data storage system, transitions the state information for the data block to a deduplication state. The controller selectively performs data deduplication for data blocks written to the data storage system based on the state information in the data structure and by reference to the fingerprints.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been particularly shown as described with reference to one or more preferred embodiments, it will be understood by those skilled in the art that various changes in form and detail may be made therein without departing from the spirit and scope of the invention. For example, although aspects have been described with respect to a data storage system including a flash controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude transmission media per se, transitory propagating signals per se, and forms of energy per se.

In addition, although embodiments have been described that include use of a NAND flash memory, it should be appreciated that embodiments of the present invention can also be used with other types of non-volatile random access memory (NVRAM) including, for example, phase-change memory (PCM) and combinations thereof.

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method of controlling a data storage system, the method comprising:
   a controller generating fingerprints of data blocks written to the data storage system;
   the controller maintaining, in a data structure, respective state information for each of a plurality of data blocks in the data storage system, wherein the state information for each data block can be independently set to indicate any of a plurality of states, and wherein the plurality of states includes at least one deduplication state in which deduplication is performed for the associated data block and at least one non-deduplication state in which deduplication is not performed for the associated data block regardless of a presence of a duplicate in the data storage system, wherein the maintaining includes:
      at allocation of a data block, initializing the state information for the data block to a non-deduplication state among the plurality of states; and
      thereafter, in response to detection of a write of a duplicate of the data block to the data storage system, transitioning the state information for the data block to a deduplication state among the plurality of states; and
   the controller selectively performing data deduplication for data blocks written to the data storage system based on the state information in the data structure and by reference to the fingerprints.

2. The method of claim 1, and further comprising setting the state information of the data block to a non-deduplication state in response to a command to create a copy of the data block.

3. The method of claim 2, and further comprising following the setting, refraining from transitioning the state information of the data block to any deduplication state until deallocation of the data block.

4. The method of claim 1, and further comprising:
   maintaining a reference count value for the data block; and
   transitioning the state information of the data block from a deduplication state to a non-deduplication state based on the reference count value.

5. A method of controlling a data storage system, the method comprising:
   a controller generating fingerprints of data blocks written to the data storage system;
   the controller maintaining a fingerprint index of data blocks written to the data storage system, wherein the fingerprint index includes both unverified ghost fingerprints and verified fingerprints, wherein the verified fingerprints represent current data of the associated data blocks and the unverified ghost fingerprints represent current data of some associated data blocks and do not represent current data of other associated data blocks;
   the controller maintaining, in a data structure, respective state information for each of a plurality of data blocks in the data storage system, wherein the state information for each data block can be independently set to indicate any of a plurality of states, and wherein the plurality of states includes at least one deduplication state in which deduplication is performed for the associated data block and at least one non-deduplication state in which deduplication is not performed for the associated data block, wherein the maintaining includes:
      at allocation of a data block, initializing the state information for the data block to a non-deduplication state among the plurality of states; and
      thereafter, in response to detection of a write of duplicate of the data block to the data storage system, transitioning the state information for the data block to a deduplication state among the plurality of states; and
   the controller selectively performing data deduplication for data blocks written to the data storage system based on the state information in the data structure and by reference to the fingerprints.

6. The method of claim 5, wherein:
   the data storage system includes non-volatile storage media and a cache; and the method further comprises storing unverified ghost fingerprints only in the cache and storing verified fingerprints in the non-volatile storage media.

7. The method of claim 5, and further comprising:
in the fingerprint index, associating unverified ghost fingerprints with input logical block addresses.

8. The method of claim 5, and further comprising:
removing unverified ghost fingerprints from the fingerprint index when transitioning the state information from the non-deduplication state to the deduplication state.

9. The method of claim 5, wherein:
the non-deduplication state is a first non-deduplication state in which an associated data block has at most one associated fingerprint in the fingerprint index;
the plurality of states further includes a second non-deduplication state in which deduplication is not performed for the associated data block and in which an associated data block can have multiple different fingerprints in the fingerprint index;
the method further comprises:
in response to an update write to a data block in the first non-deduplication state, updating the data block to a different state among the plurality of states;
in response to an update write to a data block in the second non-deduplication state, retaining the data block in the second non-deduplication state.

10. A data processing system, comprising:
a controller of a data storage system, wherein the controller is configured to perform:
generating fingerprints of data blocks written to the data storage system;
maintaining, in a data structure, respective state information for each of a plurality of data blocks in the data storage system, wherein the state information for each data block can be independently set to indicate any of a plurality of states, and wherein the plurality of states includes at least one deduplication state in which deduplication is performed for the associated data block and at least one non-deduplication state in which deduplication is not performed for the associated data block regardless of a presence of a duplicate in the data storage system, wherein the maintaining includes:
at allocation of a data block, initializing the state information for the data block to a non-deduplication state among the plurality of states; and
thereafter, in response to detection of a write of a duplicate of the data block to the data storage system, transitioning the state information for the data block to a deduplication state among the plurality of states; and
selectively performing data deduplication for data blocks written to the data storage system based on the state information in the data structure and by reference to the fingerprints.

11. The data processing system of claim 10, wherein the controller is configured to perform setting the state information of the data block to a non-deduplication state in response to a command to create a copy of the data block.

12. The data processing system of claim 11, wherein the controller is configured to perform following the setting, refraining from transitioning the state information of the data block to any deduplication state until deallocation of the data block.

13. The data processing system of claim 10, wherein the controller is configured to perform:
maintaining a reference count value for the data block; and
transitioning the state information of the data block from a deduplication state to a non-deduplication state based on the reference count value.

14. A data processing system, comprising:
a controller of a data storage system, wherein the controller is configured to perform:
generating fingerprints of data blocks written to the data storage system;
maintaining a fingerprint index of data blocks written to the data storage system, wherein the fingerprint index includes both unverified ghost fingerprints and verified fingerprints, wherein the verified fingerprints represent current data of the associated data blocks and the unverified ghost fingerprints represent current data of some associated data blocks and do not represent current data of other associated data blocks;
maintaining, in a data structure, respective state information for each of a plurality of data blocks in the data storage system, wherein the state information for each data block can be independently set to indicate any of a plurality of states, and wherein the plurality of states includes at least one deduplication state in which deduplication is performed for the associated data block and at least one non-deduplication state in which deduplication is not performed for the associated data block, wherein the maintaining includes:
at allocation of a data block, initializing the state information for the data block to a non-deduplication state among the plurality of states; and
thereafter, in response to detection of a write of a duplicate of the data block to the data storage system, transitioning the state information for the data block to a deduplication state among the plurality of states; and
selectively performing data deduplication for data blocks written to the data storage system based on the state information in the data structure and by reference to the fingerprints.

15. The data processing system of claim 14, wherein:
the data storage system includes non-volatile storage media and a cache; and
the controller is configured to perform storing unverified ghost fingerprints only in the cache and storing verified fingerprints in the non-volatile storage media.

16. The data processing system of claim 14, wherein the controller is configured to perform:
in the fingerprint index, associating unverified ghost fingerprints with input logical block addresses.

17. The data processing system of claim 14, wherein the controller is configured to perform:
removing unverified ghost fingerprints from the fingerprint index when transitioning the state information from the non-deduplication state to the deduplication state.

18. A program product, comprising:
a storage device; and
program code stored in the storage device, wherein the program code, when executed by a controller of a data storage system, causes the controller to perform:
generating fingerprints of data blocks written to the data storage system;
maintaining, in a data structure, respective state information for each of a plurality of data blocks in the data storage system, wherein the state information for each data block can be independently set to indicate any of a plurality of states, and wherein the plurality of states includes at least one deduplication state in which deduplication is performed for the associated data block and at least one non-deduplication state in which deduplication is not performed for the associated data block regardless of a presence of a duplicate in the data storage system, wherein the maintaining includes:

at allocation of a data block, initializing the state information for the data block to a non-deduplication state among the plurality of states; and thereafter, in response to detection of a write of a duplicate of the data block to the data storage system, transitioning the state information for the data block to a deduplication state among the plurality of states; and selectively performing data deduplication for data blocks written to the data storage system based on the state information in the data structure and by reference to the fingerprints.

19. The program product of claim 18, wherein the controller is configured to perform setting the state information of the data block to a non-deduplication state in response to a command to create a copy of the data block.

20. The program product of claim 19, wherein the controller is configured to perform following the setting, refraining from transitioning the state information of the data block to any deduplication state until deallocation of the data block.

21. The program product of claim 18, wherein the controller is configured to perform:

maintaining a reference count value for the data block; and transitioning the state information of the data block from a deduplication state to a non-deduplication state based on the reference count value.

22. A program product, comprising:

a storage device; and program code stored in the storage device, wherein the program code, when executed by a controller of a data storage system, causes the controller to perform:

generating fingerprints of data blocks written to the data storage system;

maintaining a fingerprint index of data blocks written to the data storage system, wherein the fingerprint index includes both unverified ghost fingerprints and verified fingerprints, wherein the verified fingerprints represent current data of the associated data blocks and the unverified ghost fingerprints represent current data of some associated data blocks and do not represent current data of other associated data blocks;

maintaining, in a data structure, respective state information for each of a plurality of data blocks in the data storage system, wherein the state information for each data block can be independently set to indicate any of a plurality of states, and wherein the plurality of states includes at least one deduplication state in which deduplication is performed for the associated data block and at least one non-deduplication state in which deduplication is not performed for the associated data block, wherein the maintaining includes:

at allocation of a data block, initializing the state information for the data block to a non-deduplication state among the plurality of states; and thereafter, in response to detection of a write of duplicate of the data block to the data storage system, transitioning the state information for the data block to a deduplication state among the plurality of states; and selectively performing data deduplication for data blocks written to the data storage system based on the state information in the data structure and by reference to the fingerprints.

23. The program product of claim 22, wherein:

the data storage system includes non-volatile storage media and a cache; and the controller is configured to perform storing unverified ghost fingerprints only in the cache and storing verified fingerprints in the non-volatile storage media.

24. The program product of claim 22, wherein the controller is configured to perform:

in the fingerprint index, associating unverified ghost fingerprints with input logical block addresses.

25. The program product of claim 22, wherein the controller is configured to perform:

removing unverified ghost fingerprints from the fingerprint index when transitioning the state information from the non-deduplication state to the deduplication state.

* * * * *